United States Patent

Sasaki et al.

[15] 3,697,173

[45] Oct. 10, 1972

[54] ELECTROPHOTOGRAPHIC PROCESSOR CAMERA

[72] Inventors: Toshiharu Sasaki; Ryuzo Miyano; Masaru Onishi, all of Osaka, Japan

[73] Assignee: Matsushita Electric Industrial Co., Ltd., Osaka, Japan

[22] Filed: March 10, 1971

[21] Appl. No.: 122,819

[30] Foreign Application Priority Data

March 13, 1970 Japan......................45/21780

[52] U.S. Cl...........................355/27, 95/14, 355/10

[51] Int. Cl..............................................G03b 27/32

[58] Field of Search.........355/3, 10, 5, 27; 95/13, 14

[56] References Cited

UNITED STATES PATENTS

| | | | |
|---|---|---|---|
| 3,040,642 | 6/1962 | Keller et al. | 95/14 |
| 2,587,350 | 2/1952 | Maiwald | 95/13 X |
| 2,878,732 | 3/1959 | Mayo et al. | 355/3 |
| 2,221,776 | 11/1940 | Carlson | 355/3 X |
| 2,831,409 | 4/1958 | Bixby et al. | 355/3 |
| 3,542,465 | 11/1970 | Pundsack | 355/10 X |

*Primary Examiner*—Samuel S. Matthews
*Assistant Examiner*—Richard L. Moses
*Attorney*—Wenderoth, Lind & Ponack

[57] ABSTRACT

A photographic apparatus for producing a visible image on a photosensitive unit including a photosensitive film mounted on a film mount. The apparatus comprises a first transfer means for transferring said unit from a supplying station to an exposure station and a second transfer means for transferring said unit from the exposure station to a processing station, whereby at said exposure station said unit is exposed to produce a latent image and said processing station includes a processing means having an opening at a side thereof. The processing means press fits the opening against the unit and forms a processing chamber to receive a processing liquid for producing a visible image on said unit. The apparatus further comprises a removing means for removing said unit from the processing station to a take-out position and driving means for driving said first and second transfer means and said processing means.

14 Claims, 43 Drawing Figures

INVENTORS
TASHIHARU SASAKI
RYUZO MIYANO
MASARU ONISHI

BY Wenderoth, Lind & Ponack
ATTORNEYS

INVENTORS
TASHIHARU SASAKI
RYUZO MIYANO
MASARU ONISHI

BY Wenderoth, Lind & Ponack
ATTORNEYS

INVENTORS
TASHIHARU SASAKI
RYUZO MIYANO
MASARU ONISHI

BY Wenderoth, Lind & Ponack
ATTORNEYS

INVENTORS
TASHIHARU SASAKI
RYUZO MIYANO
MASARU ONISHI

BY Wenderoth, Lind & Ponack
ATTORNEYS

INVENTORS
TASHIHARU SASAKI
RYUZO MIYANO
MASARU ONISHI

BY Wenderoth Lind & Ponack
ATTORNEYS

INVENTORS
TASHIHARU SASAKI
RYUZO MIYANO
MASARU ONISHI

BY Wenderoth, Lind & Ponack
ATTORNEYS

INVENTORS
TASHIHARU SASAKI
RYUZO MIYANO
MASARU ONISHI

BY Wenderoth, Lind & Ponack
ATTORNEYS

INVENTORS
TASHIHARU SASAKI
RYUZO MIYANO
MASARU ONISHI

BY Wenderoth, Lind & Ponack
ATTORNEYS

INVENTORS
TASHIHARU SASAKI
RYUZO MIYANO
MASARU ONISHI

BY Wenderoth, Lind & Ponack
ATTORNEYS

INVENTORS
TASHIHARU SASAKI
RYUZO MIYANO
MASARU ONISHI

BY Wenderoth, Lind & Ponack
ATTORNEYS

INVENTORS
TASHIHARU SASAKI
RYUZO MIYANO
MASARU ØNISHI

BY Wenderoth, Lind & Ponack
ATTORNEYS

INVENTORS
TASHIHARU SASAKI
RYUZO MIYANO
MASARU ONISHI

BY Wenderoth, Lind & Ponack
ATTORNEYS

INVENTOR
TASHIHARU SASAKI
RYUZO MIYANO
MASARU ONISHI

BY Wenderoth, Lind & Ponack
ATTORNEYS

INVENTORS
TASHIHARU SASAKI
RYUZO MIYANO
MASARU ONISHI

BY Wenderoth, Lind & Ponack
ATTORNEYS

INVENTORS
TASHIHARU SASAKI
RYUZO MIYANO
MASARU ONISHI

BY Wenderoth, Lind & Ponack
ATTORNEYS

INVENTORS
TASHIHARU SASAKI
RYUZO MIYANO
MASARU ONISHI

BY Wenderoth, Lind & Ponack
ATTORNEYS

INVENTORS
TASHIHARU SASAKI
RYUZO MIYANO
MASARU ONISHI

BY Wenderoth, Lind & Ponack
ATTORNEYS

INVENTORS
TASHIHARU SASAKI
RYUZO MIYANO
MASARU ONISHI

BY Wenderoth, Lind & Ponack
ATTORNEYS

INVENTORS
TASHIHARU SASAKI
RYUZO MIYANO
MASARU ONISHI

BY Wenderoth, Lind & Ponack
ATTORNEYS

INVENTORS
TASHIHARU SASAKI
RYUZO MIYANO
MASARU ONISHI

BY Wenderoth, Lind & Ponack
ATTORNEYS

INVENTORS
TASHIHARU SASAKI
RYUZO MIYANO
MASARU ONISHI

BY Wenderoth, Lind & Ponack
ATTORNEYS

ELECTROPHOTOGRAPHIC PROCESSOR CAMERA

FIELD OF THE INVENTION

This invention relates to a photographic apparatus for producing a visible image of any original on a photosensitive unit having a photosensitive film mounted thereon and particularly to a photographic apparatus capable of charging, exposing, developing and fixing an electrophotosensitive film mounted on a mount in a short time.

SUMMARY OF THE INVENTION

In recent years, so-called lantern slides (sometimes merely called slides) have been used widely in the field of education and in the various meetings.

In the conventional method for producing slides a roll of film is exposed to the images of multiple originals, so as to produce multiple latent images thereon, and is developed and fixed in a dark room to produce the multiple visible images thereon. Afterward, the finished roll of film is cut into a plurality of single sheets of film, each of which is finally mounted on a film mount separately. Accordingly, not only is a troublesome and time consuming operation necessary in the dark room, but the inconvenience of cutting and mounting of the finished film is also inevitable. Furthermore, the employed roll of film has a predetermined length which causes a waste of film when only a few originals are to be photographed.

Accordingly, it is an object of this invention to provide novel apparatus for producing easily and quickly a slide having a visible image thereon.

It is another object of this invention to provide an apparatus for processing a photosensitive film mounted on a mount without staining of the mount.

It is further object of this invention to provide an apparatus for producing a visible image on a photosensitive unit including a photosensitive film mounted on a film mount.

It is still another object of this invention to provide an apparatus which comprises a first transfer means reciprocally movable in a plane to transfer the photosensitive unit and a second transfer means reciprocally movable in a direction transverse to the movement of the first transfer means so as to transfer the photosensitive unit.

These objects are achieved by the provision of the following apparatus. The apparatus according to the present invention produces a visible image on a photosensitive unit including a photosensitive film mounted on a mount and comprises supplying means for supplying said photosensitive unit to a supplying station, an exposure station for exposing said film to an image of an original projected by a light source and an optical system so as to form a latent image on said film, first transfer means for transferring said unit from said supplying station to said exposure station and maintaining said unit at said exposure station during exposure, a processing station for applying processing liquid to said exposed film in order to produce a visible permanent image on said film, said processing station including processing means provided with an opening, whereby said processing means press-fits said opening against a principal plane of said film and forms a processing space to receive said processing liquid when said photosensitive unit is transferred to said processing station, second transfer means for transferring said unit from said exposure station to said processing station, removing means for removing said unit from processing station to a take-out position, and driving means for driving said first and second transfer means and said processing means.

Other and further objects of this invention will be apparent from the following detailed description taken together with the accompanying drawings.

DESCRIPTION OF THE PREFERRED EMBODIMENT

Figure 1:
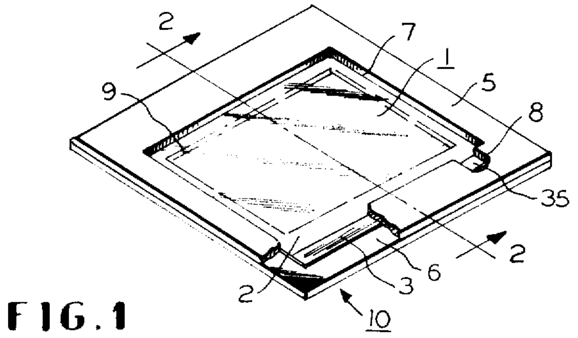
FIG. 1 is a perspective view of the photosensitive unit used in the apparatus according to this invention.

While a preferred embodiment of the invention is described herein, it is contemplated that considerable variation may be made in the method of operation and the construction of parts without departing from the spirit of the invention.

In the following description and in the claims, parts will be identified by specific names for convenience, but they are intended to be generic in their application to similar parts as the art will permit.

Referring to the drawings which illustrate a preferred embodiment of the apparatus constructed in accordance with the present invention.

Figure 2:
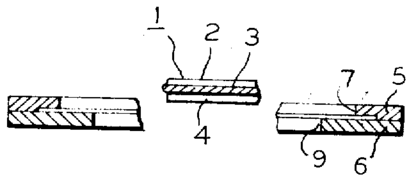
FIG. 2 is a sectional view taken on line 2—2 of FIG. 1 and an enlarged sectional view of the electrophotosensitive film.

FIG. 1 and FIG. 2 show a photosensitive unit for the apparatus according to this invention. The photosensitive unit 10 has a transparent film 1 mounted between a first mount 5 and a second mount 6. The transparent film 1 is composed of a photosensitive layer 2, a conductive layer 3 and a substrate 4. The photosensitive layer 2 is a transparent electrophotosensitive material such as an organic photoconductor which consists of poly-N-vinylcarbazole and the conductive layer 3 is a transparent layer such as cuprous iodide. The substrate 4 is made of cellulose triacetate or polyethylene terephthalate. The conductive layer 3 is exposed on one side of the transparent film 1. The transparent film 1 can be electrically grounded through an exposed conductive layer 35 during the charging. The outside size of the first mount 5 and the second mount 6 can be determined arbitrarily but the preferable size is the same size as a conventional slide mount such as 2 by 2 inches, because of the easy projection of the finished photosensitive units by a conventional slide projector. The first mount 5 has a first aperture 7 formed at the photosensitive side of the film 1 and the second mount 6 has a second aperture 9, through which the finished image on the film 1 is projected. The second aperture 9 is smaller in size than the first aperture 7, and defines an effective image area to be projected. The size of the first aperture 7 is larger than an opening formed in a processing means (which is described hereinafter) so that the stains on the first mount 5 caused by the processing liquid are eliminated. On the other hand, the size of the second aperture 9 is smaller than the opening formed in the processing means so that the effective area defined by the second aperture 9 excludes the unevenness of the image quality which is often generated at the marginal portion of the image area. The first mount 5 has a cutout portion 8 which exposes said exposed conductive layer 35 in order to make it easy to establish the electrical grounding of the film 1. Hereinafter, the photosensitive unit 10 is called merely the unit 10.

Figure 3:
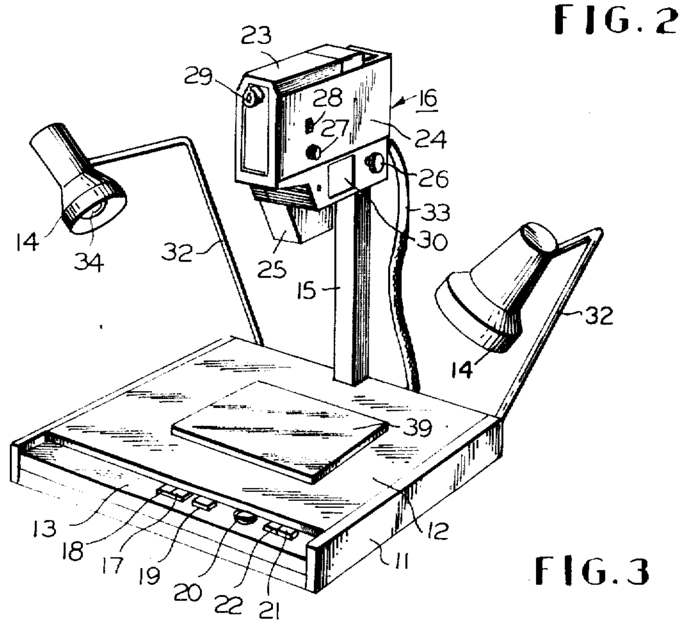
FIG. 3 is a perspective view of one embodiment according to this invention.
Figure 4:
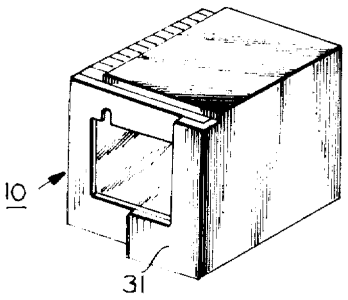
FIG. 4 is a perspective view of the photosensitive units received in a cartridge.
Figure 5:
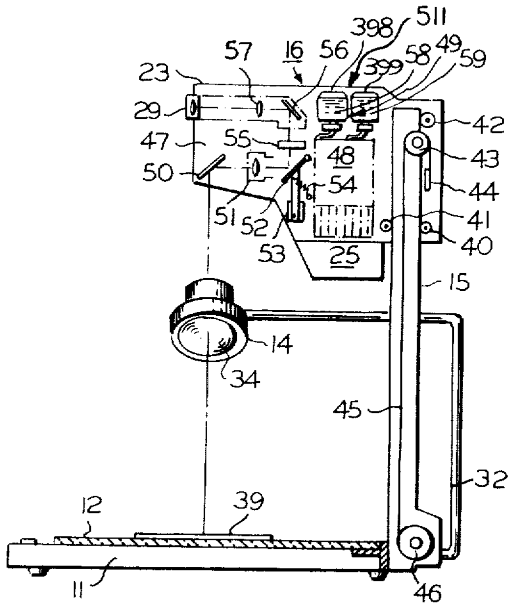
FIG. 5 is a schematic side sectional view of FIG. 3.

FIG. 3 shows a perspective view of a general embodiment of an apparatus according to this invention and FIG. 5 shows a schematic central sectional view of the apparatus. The apparatus comprises a base 11, a plate 12 for an original 39, a control panel 13, a pair of light sources 14, a column 15 fixed to the base 11, and a camera assembly 16, which is reciprocally movable along the column 15. The control panel 13 comprises a power switch 17, a pilot lamp 18 for power switch 17, a lamp switch 19, a timer knob 20 for determining a suitable exposure time, a start switch 21 for the apparatus and an indicator lamp 22 for the start switch 21. The light sources 14 comprises a pair of pipes 32 fixed to the base 11 and a pair of main lamp 34. The camera assembly 16 is electrically connected with control panel 13 by an electrical cord 33. The camera assembly 16 has a camera case 23, a pair of side panels 24, and outlet 25 for ejecting the unit 10 having a visible image thereon, a locking knob 26 for fixing the camera assembly 16 in an arbitrary position along the column 15, a focusing knob 27, an iris knob 28 and a finder 29 for focusing and trimming. The camera case 23 has an inlet 30 for supplying the units 10 and a cover plate for the inlet 30. As shown in FIG. 4, the units 10 are loaded into a cartridge 31 and are supplied to the camera assembly 16 at the inlet 30. According to FIG. 5, the general internal construction of the camera assembly 16 will be described. The camera case 23 has rollers 40, 41 and 42 which are slidable along the column 15. The column 15 has a guide roller 43 at the upper portion thereof, and a spring roller means 46 at the base thereof. A belt 45 connects the spring roller means 46 with a fixed plate 44 which is fixed to the camera case 23. The spring force of the spring roller means 46 biases the camera assembly 16 upwardly so that the camera assembly 16 can be moved up and down easily along the column 15 by manual operation so as to change the reduction ratio. The camera assembly 16 can be fixed at a desired position by turning the locking knob 26.

The camera assembly 16 comprises an optical system 47 and a mechanical assembly 48. The processing liquids 49 are positioned at the upper portion of the camera assembly 16. The optical system 47 comprises a first mirror 50, a lens 51, a second mirror 52, a focusing plate 55, a third mirror 56 and a finder lens 57. The reflected rays from an original 39 are reflected to the lens 51 by the first mirror 50 and are normally focused onto the focusing plate 55 by the second mirror 52 which is normally at the position shown in FIG. 5 under the bias of a spring 54. The image on the focusing plate 55 is again reflected by the third mirror 56 to the lens 57 and can be observed through the finder 29 for focusing and trimming of the original 39. Upon arrival of the unit 10 at an exposure station, a first solenoid 53 moves the second mirror 52 upwardly against the spring force of spring 54 so that the image of the original is projected onto the unit 10. At the end of the exposure time, the second mirror 52 returns to the initial position by the action of spring 54.

The processing liquids 49 include developing liquid 58 and fixing liquid 59 which are stored respectively in the receptacles 398 and 399 positioned at the upper portion of the mechanical assembly 48. A predetermined quantity of the developing liquid 58 and the fixing liquid 59 are supplied to the processing means in association with the movement of the mechanical assembly 48.

Figure 6:
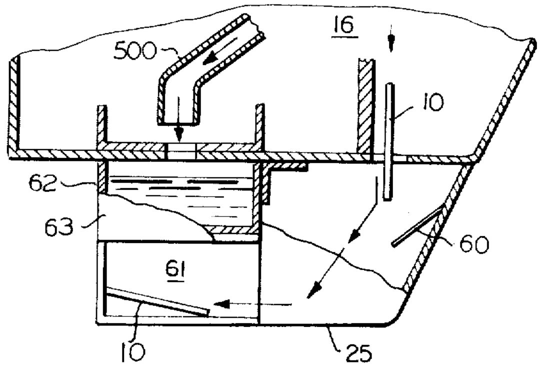
FIG. 6 is a back side sectional view of a part of FIG. 5.
Figure 7:
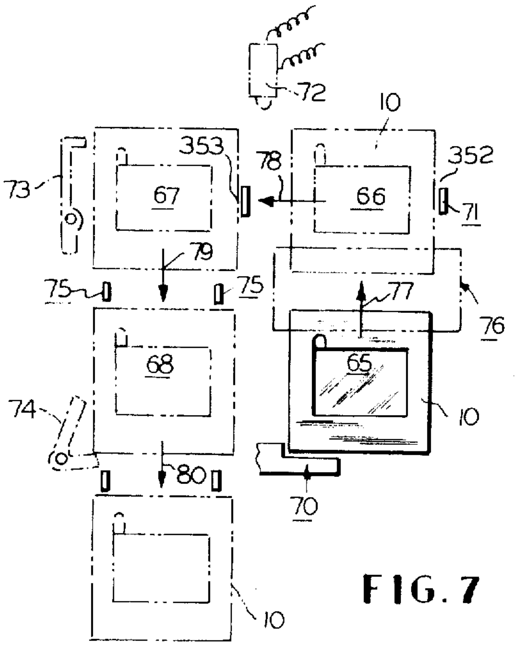
FIG. 7 is a diagrammatic illustration showing the movement of the photosensitive unit according to this invention.
Figure 8:
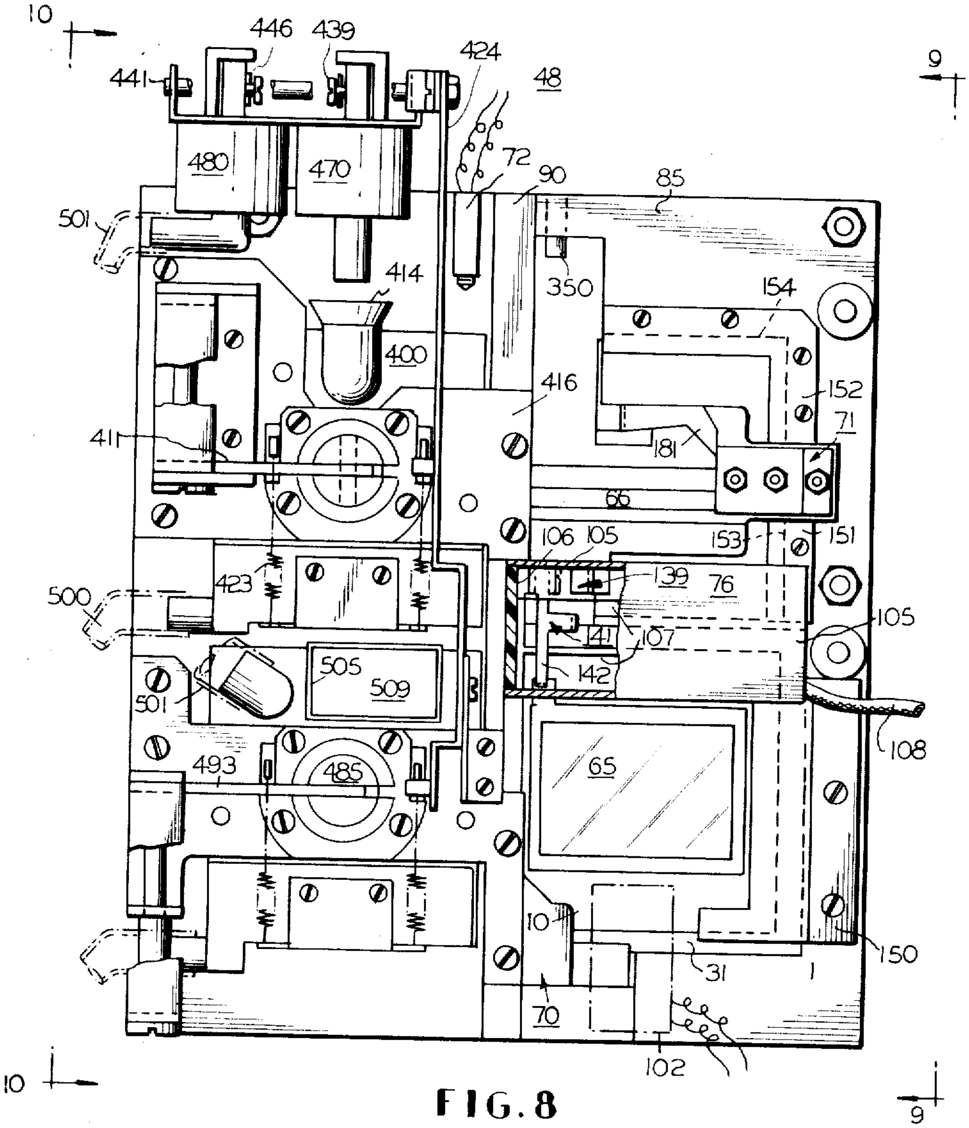
FIG. 8 is a front elevational view of a mechanical assembly according to this invention, partly in section and partly broken away for the purpose of clearness.

The following description will outline the fundamental operation of the mechanical assembly 48 with reference to FIG. 7. One of the photosensitive units 10 loaded in the cartridge 31 (which is shown in FIG. 4 or FIG. 8) is transferred from a supplying station 65 in an upward direction shown by an arrow 77 by means of a first movement of a first transfer means 70. During the first movement, the unit 10 is electrostatically charged by a charging device 76. When the unit 10 is transferred to an exposure station 66, the first transfer means 70 stops and causes an electric switch 72 to light the main lamps 34. At the same time, the electric switch 72 energizes the first solenoid 53 so that the unit 10 is exposed as described above. Upon completion of exposure, a second transfer means 71 transfers the unit 10 from the exposure station 66 to a developing station 67 in a direction of an arrow 78. The unit 10 arriving at the developing station 67 moves a developing detecting lever 73 which actuates a developing means 400 (which will be described hereinafter) to develop the exposed unit 10. After the development, a second movement of the first transfer means 70 transfers the unit 10 from the developing station 67 to a fixing station 68 in a direction of an arrow 79, and the first transfer means 70 returns to the initial position so that the first transfer means 70 is again capable of transferring another unit 10 from the supplying station 65 to the exposure station 66. During the second movement of the first transfer means 70, the second transfer means 71 returns to the initial position thereof. The first transfer means 70 arriving at the fixing station 68 moves fixing detecting lever 74 which actuates a fixing means 485 in order to fix the developed unit 10. After the fixation, a removing means 75 removes the fixed unit 10 from the fixing station 68 in a direction of an arrow 80. As shown in FIG. 6, the finished unit 10 is guided along a guide plate 60 and is taken away to a take-out position 61 of the outlet 25. On the other hand, the used liquids 62 are drained to a drain receptacle 63 which is positioned at the outlet 25.

Figure 9:
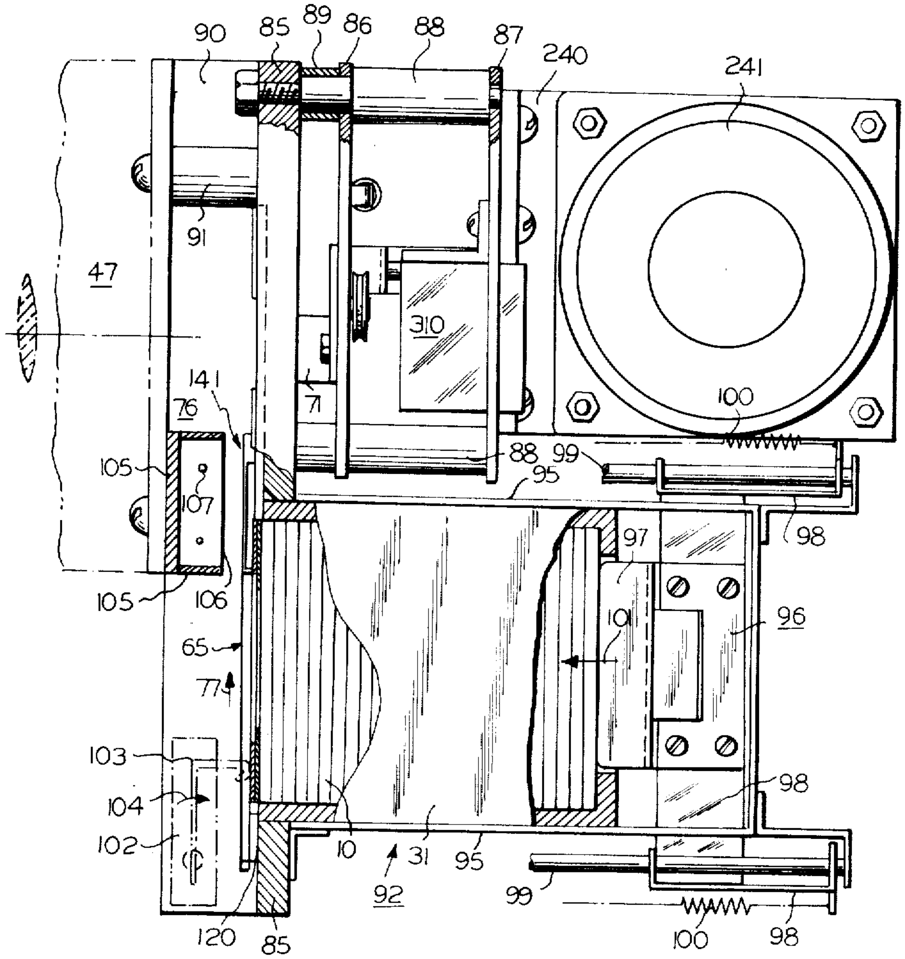
FIG. 9 is a right side elevational view taken on line 9—9 of FIG. 8, partly in section and partly broken away for the purpose of clearness.
Figure 10:
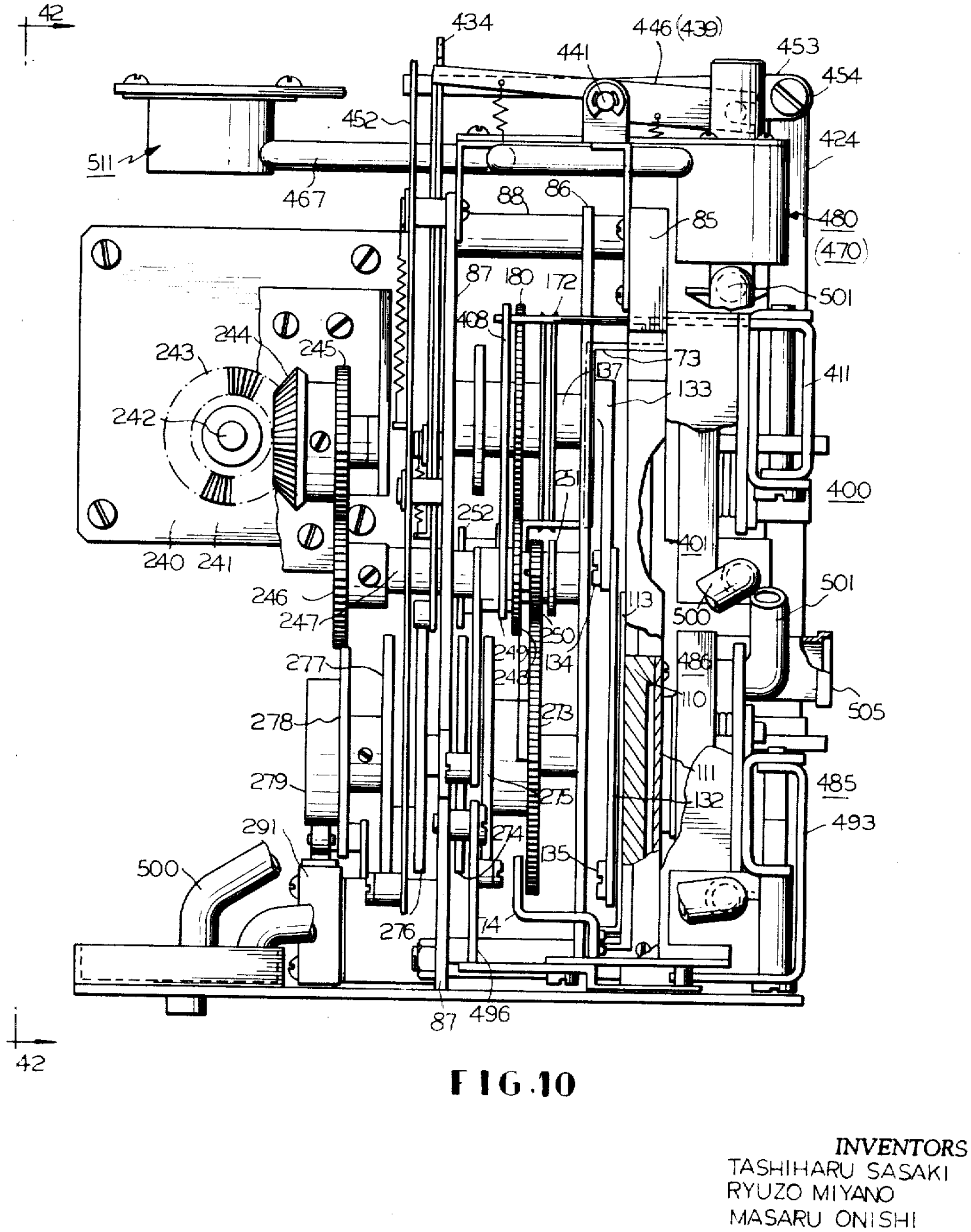
FIG. 10 is a left side elevational view taken on line 10—10 of FIG. 8, partly in section.

The following will describe in detail the mechanical assembly 48. The mechanical assembly 48 comprises a unit supporting means 92, the charging device 76, the first transfer means 70, the second transfer means 71, the developing means 400, the fixing means 485, a drying means 509, the removing means 75, a control means 296, a grounding means 141 and a driving means 109. Referring to FIG. 9 and FIG. 10, the skeleton of the mechanical assembly 48 is composed of a first base 85, a second base 86, a third base 87, and stay-bolts 88 and spacers 89 which connect those three bases. The first base 85 has a guiding portion for the unit 10 and a guiding portion for the first transfer means 70 which will be described hereinafter. The first base 85 further includes supporters 90 having a developing chamber 401 and a fixing chamber 486 attached there and has stay-bolts 91 having the aforementioned optical system 47 fixed thereto. A motor and a driving mechanism for the mechanical assembly 48 are attached on the second base 86 and the third base 87.

As shown in FIG. 8 and in FIG. 9, the unit supplying means 92 is positioned at the supplying station 65, and comprises the cartridge 31, a cartridge holder 95, a pushing member 96 and a first electric switch 102. The cartridge holder 95 is fixed to the first base 85. The pushing member 96 is composed of a slide plate 98 slidable along a pair of guide rails 99, a pushing plate 97 attached to the slide plate 98 and a pair of springs 100 which forces the pushing plate 97 to push the unit 10 in the direction of the arrow 101. A foremost unit 10 is transferred by a kicker 120 in the direction of the arrow 77 in a principal plane of the unit 10, and the remaining unit 10 moves in the direction of the arrow 101 due to the pushing plate 97 at every transfer of a unit 10. A first electric switch 102 having an actuating lever 103 is positioned adjacent to the supplying station 65 and detects the presence of the unit 10 at the supplying station 65. When at least one of the units 10 is at the supplying station 65, the actuating lever 103 touches the foremost unit 10 and causes the switch 102 to close. But in the absence of a unit 10 at the supplying station 65, the actuating lever 103 moves in the direction of the arrow 104 and causes the switch 102 to open. Thus, the switch 102 constitutes a lock-out circuit which prevents the apparatus from operation in the absence of a unit 10.

The charging device 76 is located at a position between the supplying station 65 and the exposure station 66 in a plane parallel to and spaced from the transfer plane of the unit 10. The charging device 76 is a corona discharge type such as is used in a conventional electrophotographic apparatus. The charging device 76 consists of a conductive member 105, a plurality of fine tungsten wires 107, a pair of insulation members 106 for supporting the wires 107 and a high tension electric cord 108. The tungsten wires 107 are electrically insulated from the conductive member 105, and are supplied with a D.C. high tension voltage through the cord 108 to discharge a uniform corona charge to the sensitive surface of the units 10 while the unit 10 is being transferred from the supplying station 65 to the exposure station 66.

Figure 11:
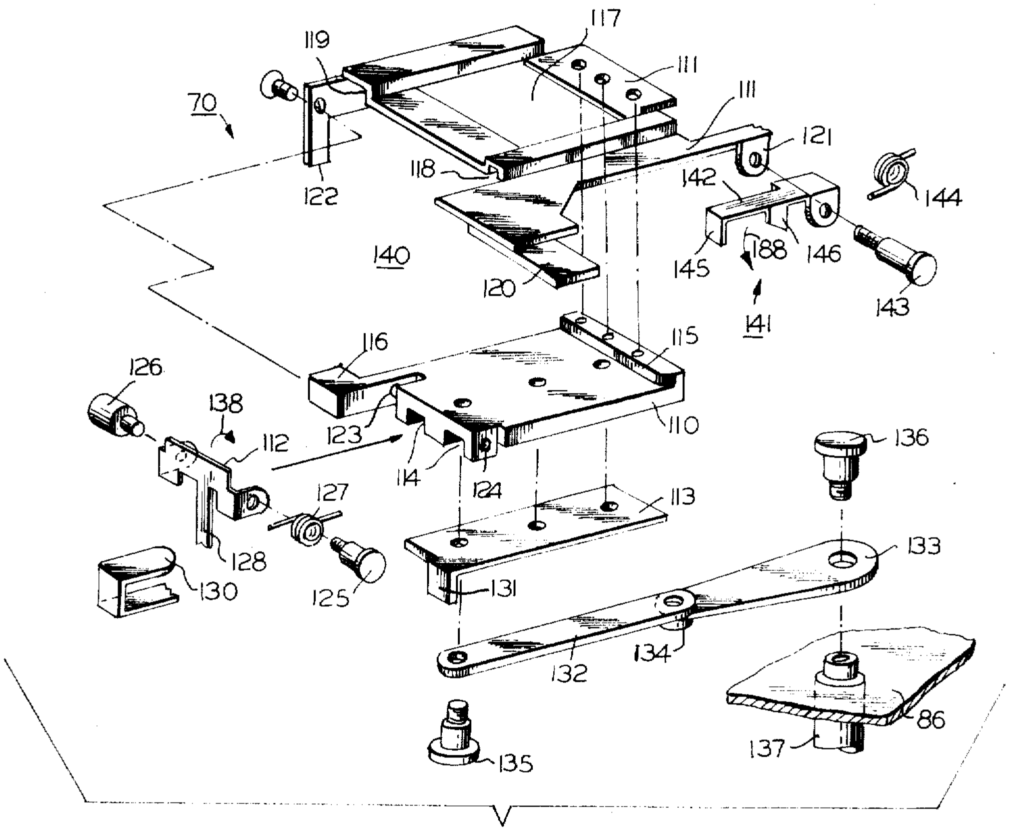
FIG. 11 is an exploded perspective view of a first transfer means.
Figure 12:
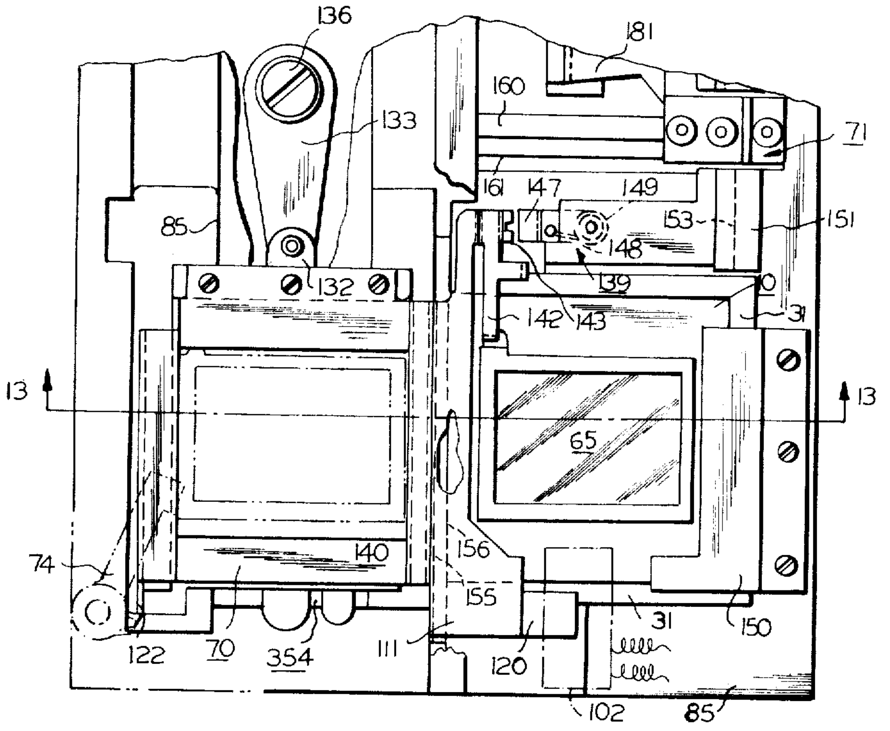
FIG. 12 is an enlarged fragmentary front view of FIG. 8 with certain parts broken away for the purpose of clearness and shows the relationship between the first transfer means and a supply station.
Figures 17, 18:
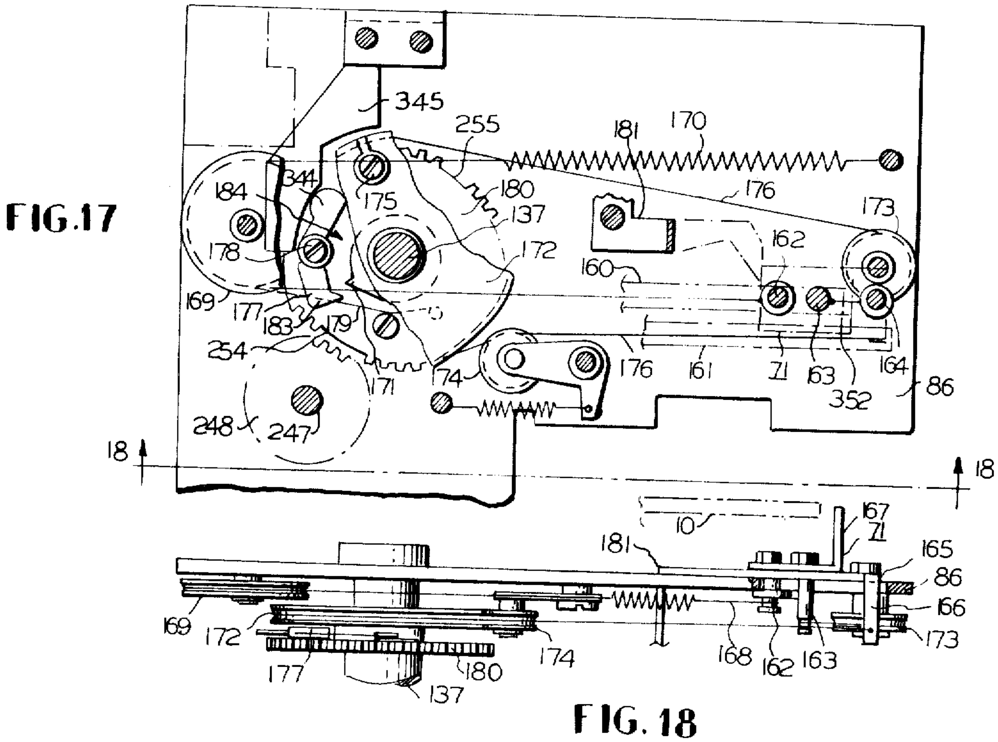
FIG. 17 is a fragmentary view of a winding means for driving the second transfer means.
FIG. 18 is a sectional view taken on line 18—18 of FIG. 17.
Figure 19:
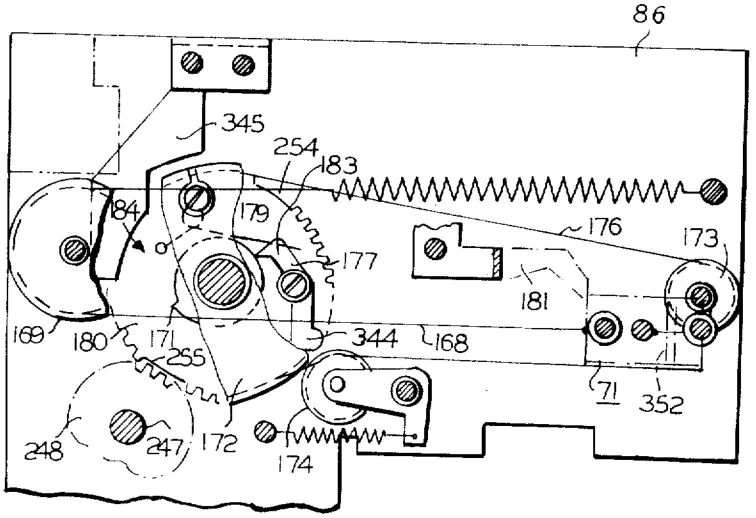
FIG. 19 is a fragmentary view similar to that of FIG. 18 and shows the winding means occupying another position.
Figure 20:
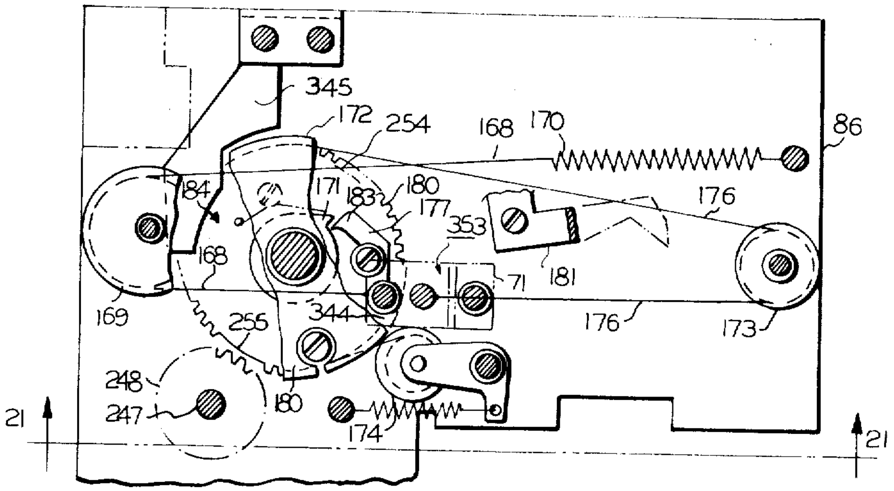
FIG. 20 is a fragmentary view similar to that of FIG. 19 and shows the second transfer means after it has moved from the exposure station to the developing station.
Figure 21:
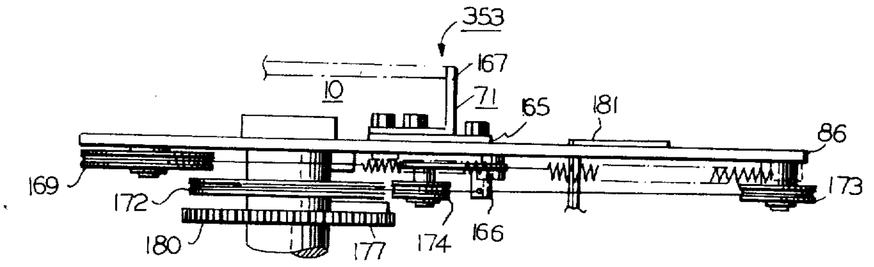
FIG. 21 is a sectional view taken on line 21—21 of FIG. 20.

The following will describe the transfer means. The transfer means includes the first transfer means 70, the second transfer means 71 and driving mechanisms for these two transfer means. With the reference to FIG. 11, the first transfer means 70 will be described at first. The first transfer means 70 is composed of a unit holder 140 and the kicker 120. The unit holder 140 consists of a movable pedestal 110 slidable along the first base 85. The pedestal 110 has two slots 114 thereon, along which the pedestal 110 is slidably guided on the first base 85. The pedestal 110 also has a protruding portion 115 which is slightly larger in thickness than that of the unit 10. The keeping plate 111 is fixed to the pedestal 110 at the protruding portion 115 and at a projecting portion 116 by means of screws. A space formed between the pedestal 110 and the keeping plate 111 is capable of holding the unit 10 therein. The keeping plate 111 has an opening 117 through which the unit 10 held in the unit holder 140 is processed by a processing means 510, and has a pair of channels 118 and 119 through which a pair of removing levers 194 of the removing means 75 pass to remove the unit 10. The keeping plate 111 is provided with the kicker 120 for transferring the unit 10 from the supplying station 65 to the exposure station 66. The kicker 120 is located at the supplying station 65 when the unit holder 140 occupies the fixing station as shown in FIG. 12. The keeping plate 111 is further provided with a lag portion 121 for supporting a grounding member 142 and with stick-out portion 122 for actuating the fixing detecting lever 74. The guiding plate 112 is rotatably fixed to the screw holes 123 and 124 of the pedestal 110 by means of the screws 125 and 126, and is biased to rotate in a direction of an arrow 138 by the spring 127. The guiding plate 112 is rotated around an axis of the screws 126 and 125 in the opposite direction to the direction of the arrow 138 by the abutment of a salient portion 128 with a slide member 130 in order to release the unit 10 after the fixation. The abutment plate 113 has a bent down portion 131 for controlling the removing means 75 which will be described hereinafter. The kicker 120 transfers the unit 10 from the supplying station 65 to the exposure station 66 and maintains the unit 10 at the exposure station 66 during exposure. The unit holder 140 maintains the unit 10 at the developing station 67 and at the fixing station 68 during developing and fixing, respectively, and transfers the unit 10 from the developing station 67 to the fixing station 68. As shown in FIG. 11, the driving mechanism for driving the first transfer means 70 consists of a crank arm 133 fixed to a first driving shaft 137 by means of a pin 136, a crank lever 132 for connecting the pedestal 110 with the crank arm 133 by means of screws 134 and 135. The following will describe the second transfer means 71 and the driving mechanism for the second transfer means 71. As shown in FIG. 17 and FIG. 18, the second transfer means 71 consists of a slide plate 165 having a plurality of guide pins 162, 163 and 164 which are slidable along a slot 160 formed on the second base 86, and of a transfer plate 167 which is L-shaped and is attached to the slide plate 165. Referring to FIG. 8, FIG. 12, and FIG. 18, the second transfer means 71 normally occupies a first position 352 which is adjacent to the unit 10 arriving at the exposure station 66, but is spaced from the unit 10. Upon completion of exposure, the transfer plate 167 engages the side portion of the unit 10 so as to transfer the unit 10 from the exposure station 66 into the unit holder 140 of the first transfer means 70 which remains at the developing station 67. The driving mechanism for driving the second transfer means 71 consists of a spring 170 attached to the guide pin 162 by a string 168 by way of a pulley 169, and a winding means 184 for the second transfer means 71. A locking member 181 locks the second transfer means 71 at the first position 352 thereof. As shown in the drawings from FIG. 17 to FIG. 21, the second transfer means 71 is biased by the spring 170 in a direction from the exposure station 66 to the developing station 67. The winding means 184 comprises a winding pulley 172 rotatably mounted on the first driving shaft 137 and having a nail portion 171 thereon, an idler pulley 173, and a winding string 176 for connecting a bent portion 166 of the slide plate 165 with the guide pin 163 by way of the winding pulley 172 and the tension pulley 174. The winding string 176 is fixed to the winding pulley 172 by a pin 175. A nail lever 177 is pivotally fixed on a first driving gear 180 by a screw 178 and is biased to rotate around an axis of the screw 178 by a spring 179. When the nail lever 177 engages the nail portion 171 of the winding pulley 172, the winding pulley 172 rotates counter clockwise so as to drive the second transfer means 71 to the right in the drawings.

Figure 13:
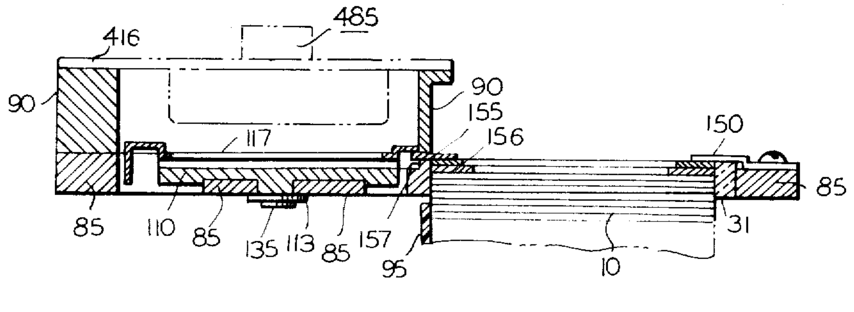
FIG. 13 is a sectional view taken on line 13—13 of FIG. 12.
Figure 14:
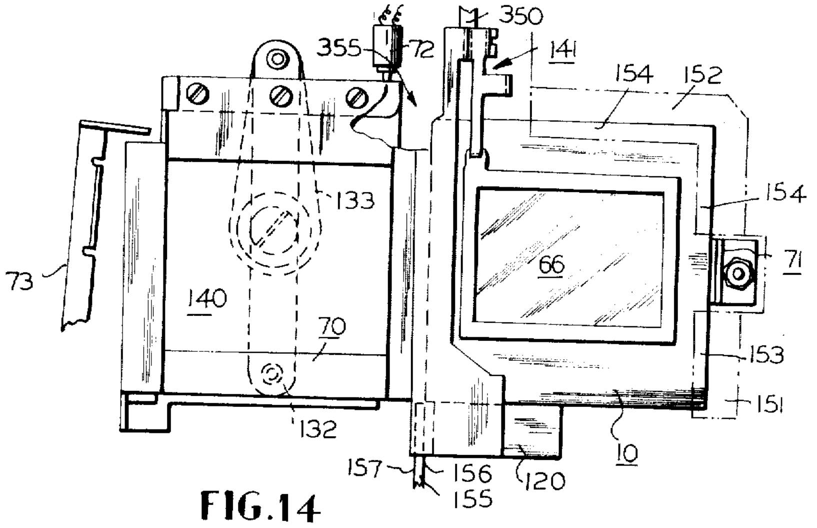
FIG. 14 is a fragmentary front view of the first transfer means when the photosensitive unit is transferred from the supplying station to an exposure station.
Figure 15:
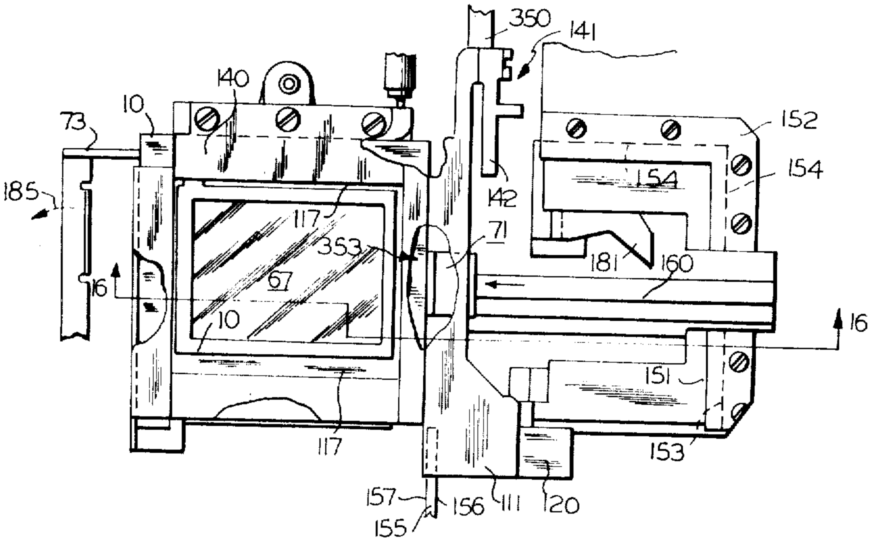
FIG. 15 is a fragmentary view similar to that of FIG. 14 except that the photosensitive unit is transferred from the exposure station to a developing station by a second transfer means.
Figure 16:
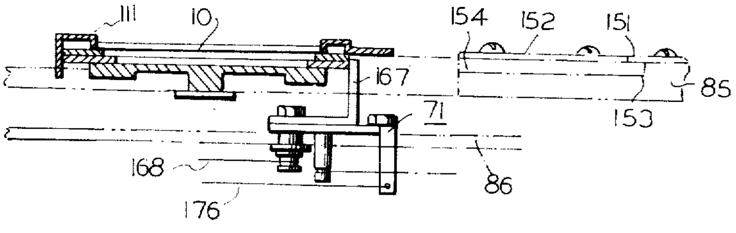
FIG. 16 is a sectional view taken on line 16—16 of FIG. 15.

The following will outline the movement of the first transfer means 70 and the second transfer means 71. The first transfer means 70 normally occupies a first position 354 as shown in FIG. 12. In FIG. 12, the unit 10 is pressed by the pushing member 96 (which is shown in FIG. 9) from behind the drawing to in front of the drawing and is restricted by a first unit guide 150 and the keeping plate 111. The both sides, right and left, of the unit 10 are guided by a side wall of the cartridge 31 and a side portion 156 of a rail 155. (FIG. 13) The kicker 120 transfers a foremost unit 10 to the exposure station 66 by the first movement of the first transfer means 70. During the first movement, the unit 10 is guided not only by the side portion 156 and by the first transfer means 70 but also by a wall portion 153 and 154, and is restricted by a second unit guide 151 and by a third unit guide 152. While the unit 10 is being transferred, the unit is electrostatically charged by the charging device 76 as mentioned above. The first transfer means 70 stops at the second position 355 as shown in FIG. 14. During the exposure, the kicker 120 maintains the unit 10 at the exposure station 66 so as to prevent the unit 10 from the movement which might result in a damage of the image. Upon completion of exposure, the second transfer means 71 is released from the locking member 181 and moves in a first motion thereof from the first position 352 thereof to a second position 353 thereof under the force of the spring 170. The first motion of the second transfer means 71 transfers the unit 10 into the unit holder 140 which is at the developing station 67 (FIG. 15 and FIG. 16). As shown in FIG. 15, the unit 10 causes the developing detecting lever 73 to rotate around an axis thereof in a direction of an arrow 185 at the developing station 67, so that a second driving gear 273 starts to rotate in order to operate the developing means 400. The details of the developing means will be described hereinafter. After the development, the second movement of the first transfer means 70 transfers the unit 10 to the fixing station 68 and returns the first transfer means 70 to the first position 354 as shown in FIG. 12. During the second movement of the first transfer means 70, the second transfer means 71 returns to the first position 352 thereof against the action of spring 170 by the action of the winding means 184 and is locked at the first position 352 by the locking member 181. The details of the movement of the winding means 184 will be described hereinafter. When the first transfer means 70 arrives at the fixing station 68, (that is, the first position 354) the stick-out portion 122 actuates the fixing detecting lever 74 to initiate the operation of the fixing means 485. After the fixation, the finished unit 10 is removed from the unit holder 140 to the take-out position 61 by means of the removing means 75 which is described hereinafter.

Figures 22, 23:
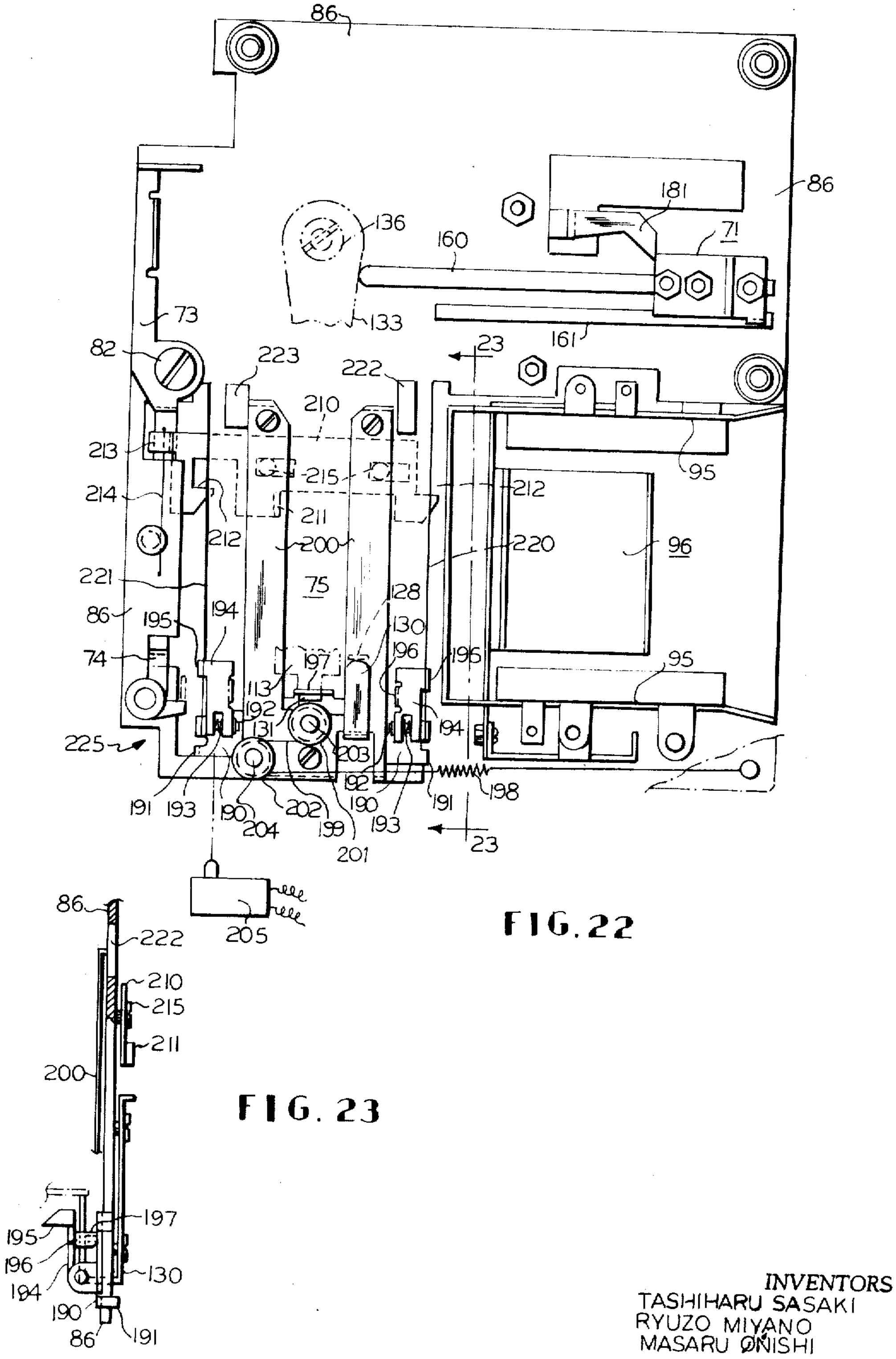
FIG. 22 is a fragmentary front elevational view of the mechanical assembly shown in FIG. 8 with certain parts broken away for purpose of clearness and shows a removing means and the relationship between the removing means and other mechanical parts.
FIG. 23 is a sectional view taken on line 23—23 of FIG. 22.

FIG. 22 is an elevational view of the second base 86 and the removing means 75 with the first base 85 removed. The removing means 75 comprises a sliding plate 190 having a pair of first bent portions 191 which are slidable along a pair of slots 220 and 221 formed on the second base 86, a pair of removing levers 194 rotatably mounted on the sliding plate 190 on a pair of axles 192 and a second electrical switch 205 engageable with the sliding plate 190. The removing lever 194 has a tapered tongue portion 196, a projecting portion 195 engageable with the unit 10, and is biased by a torsion spring 193 so that the tapered tongue portion 196 is in contact with the second base 86. The pair of removing levers 194 are movable at the positions corresponding to the channels 118 and 119 on the unit holder 140, respectively. The sliding plate 190 is slidably interposed between the second base 86 and a pair of guide plates 200 which are attached to the second base 86. The sliding plate 190 has a second bent portion 197 which is engageable with the bent portion 131 of the abutment plate 113. A string 199 is attached to the second bent portion 197 and is connected to a spring 198 by way of rollers 201 and 202 which are mounted on the guide plate 200. The removing means 75 is biased to be movable downward by the spring 198. The second electric switch 205 is positioned adjacent to the fixing station 68 and is operable by the movement of the sliding plate 190. The switch 205 closes the circuit when the sliding plate 190 occupies a second position 225 as shown in FIG. 22, and opens the circuit when the sliding plate 190 occupies a first position 226 as shown in FIG. 24.

Figure 26:
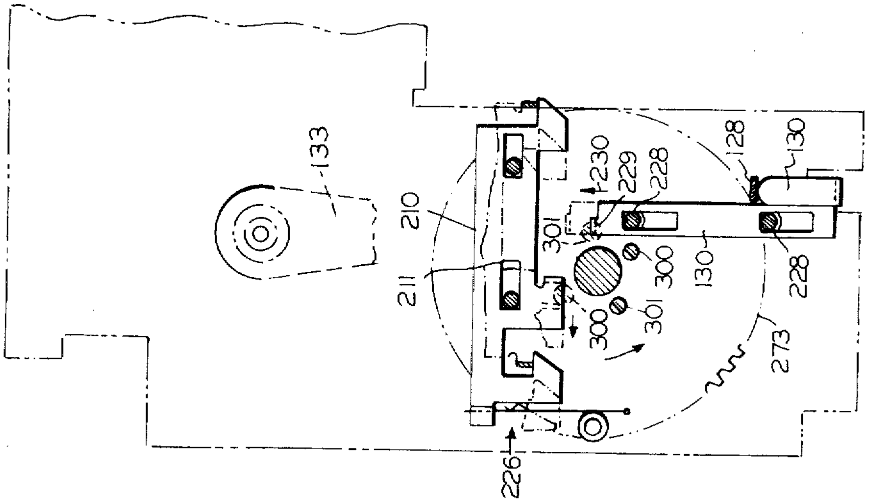
FIG. 26 is a fragmentary view of the mechanical parts which belong to the removing means.
Figure 25:
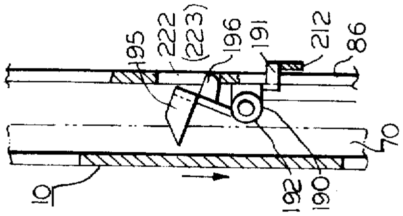
FIG. 25 is a sectional view taken on line 25—25 of FIG. 24.
Figure 24:
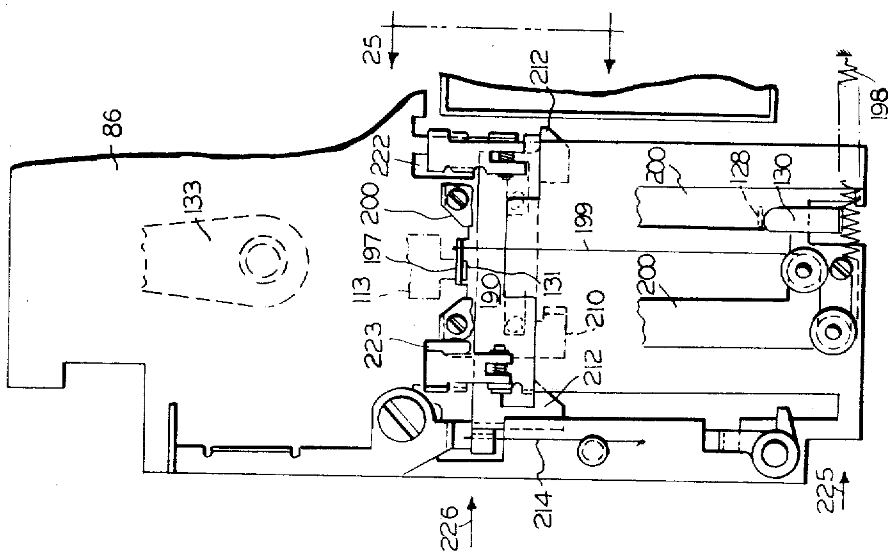
FIG. 24 is a fragmentary view of FIG. 22 and shows an enlarged front view of the removing means.

Referring to FIG. 22, and FIG. 24, the locking means for locking the removing means 75 at the first position 226 is described in the following. A lock member 210 is slidable on a pair of pins 215 attached to the second base 86, and is biased to the right by a spring 214 in the drawing. The lock member 210 has a pair of stop portions 212 corresponding to the pair of first bent portion 191 of the sliding plate 190. When the removing means 75 arrives at the first position 226, the stop portions 212 engage with the first bent portions 191 so as to lock the removing means 75 at the first position 226, and the tapered tongue portions 196 project into a pair of holes 222 and 223 formed in the second base 86 under the action of the torsion springs 193 so that the projecting portions 195 are out of the path of the unit 10 for avoidance of engagement of the projecting portions 195 with the unit 10. The removing means 75 is continuously locked at the first position 226 until the unit 10 is fixed at the fixing station 68. In order to remove the unit 10, the tapered tongue portions 196 engage with the edges of the holes 222 and 223 so as to return the projecting portions 195 into the path of the unit 10. Just before the operation of the removing means 75, the guiding plate 112 mounted on the unit holder 140 is rotated to release the unit 10. The rotation of the guiding plate 112 is described in the following. The slide member 130 is slidably mounted on the second base 86 on a pair of pins 228 as shown in FIG. 26. A bent portion 229 formed on the slide member 130 engages with a pin 301 which is attached to the second driving gear 273 in order to move the slide member 130 in the direction of an arrow 230 in FIG. 26. Finally, the slide member 130 engages with the salient portion 128 so as to rotate the guiding plate 112 around the axis of rotation thereof. After the guiding plate 112 is rotated, a detecting portion 211 formed on the lock member 210 engages with a pin 300 attached to the second driving gear 273 to release the engagement between the removing means 75 and the lock member 210 so that the removing means 75 moves from the first position 226 to the second position 225 by the spring force of the spring 198 and then the unit 10 is taken out from the unit holder 140 to the outlet 25. During the first movement of the first transfer means 70, the removing means 75 returns from the second position 225 to the first position 226 by the engagement of the abutment plate 113 with the second bent portion 197.

Figures 27, 28:
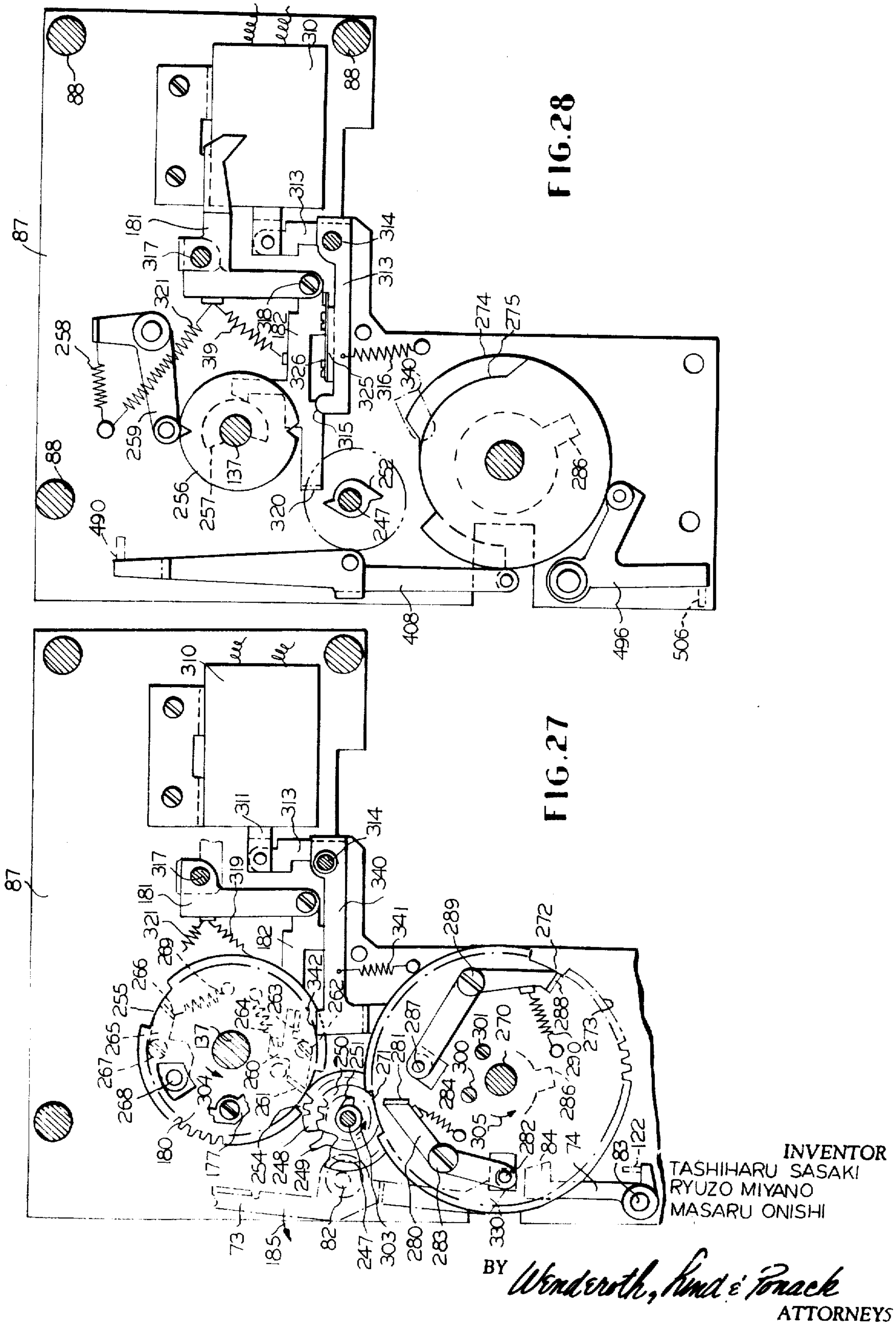
FIG. 27 is a front elevational view of a driving means of the apparatus according to this invention.
FIG. 28 is a fragmentary view similar to that of FIG. 27, but certain parts are broken away for purpose of clearness.

The following will be a description of the details of the driving means 109 for the mechanical assembly 48. The driving means 109 comprises a driving power source, a main shaft 247 the first driving shaft 137, a second driving shaft 270 and a plurality of gear assemblies. As shown in FIG. 9 and FIG. 10, an electric motor 241 is employed as a driving power source and is mounted on a motor plate 240 which is fixed to the third base 87. Referring to FIG. 10, FIG. 27 and FIG. 28, the main shaft 247 comprises a second spur gear 246, a first main gear 248, a first nail wheel 249, a second main gear 250, a second nail wheel 251, and third nail wheel 252. The first driving shaft 137 comprises the first driving gear 180 which is provided with a first cut-out portion 254 and a second cut-out portion 255, a first detent wheel 256, and a cut-out wheel 257. Further the first driving shaft 137 has the winding pulley 172 rotatably mounted thereon. The first driving gear 180 has a first clutch member 260, a second clutch member 265 and a nail lever 177 mounted thereon. The second driving shaft 270 has a second driving gear 273 which is provided with a third cut-out portion 271 and a fourth cut-out portion 272, a developing cam 274, a fixing cam 275, a liquid supplying cam 276, a liquid exhaust cam 277, a second detent wheel 278 and a drying cam 279 (FIG. 10). The second driving gear 273 has a third clutch member 280, a fourth clutch member 285, and the pins 300 and 301 attached thereto. The main shaft 247, the first driving shaft 137, and the second driving shaft 270 are supported by the second base 86 and the third base 87, and are adapted to rotate in the directions of the arrows 303, 304 and 305, respectively. The driving power of the motor 241 is transmitted to the main shaft 247 through first bevel gear 243 fixed to a shaft 242 of the motor 241, a second bevel gear 244, a first spur gear 245 fixed to the second bevel gear 244, and the second spur gear 246. The main shaft 247 is continuously rotated by the motor 241.

Figure 42:
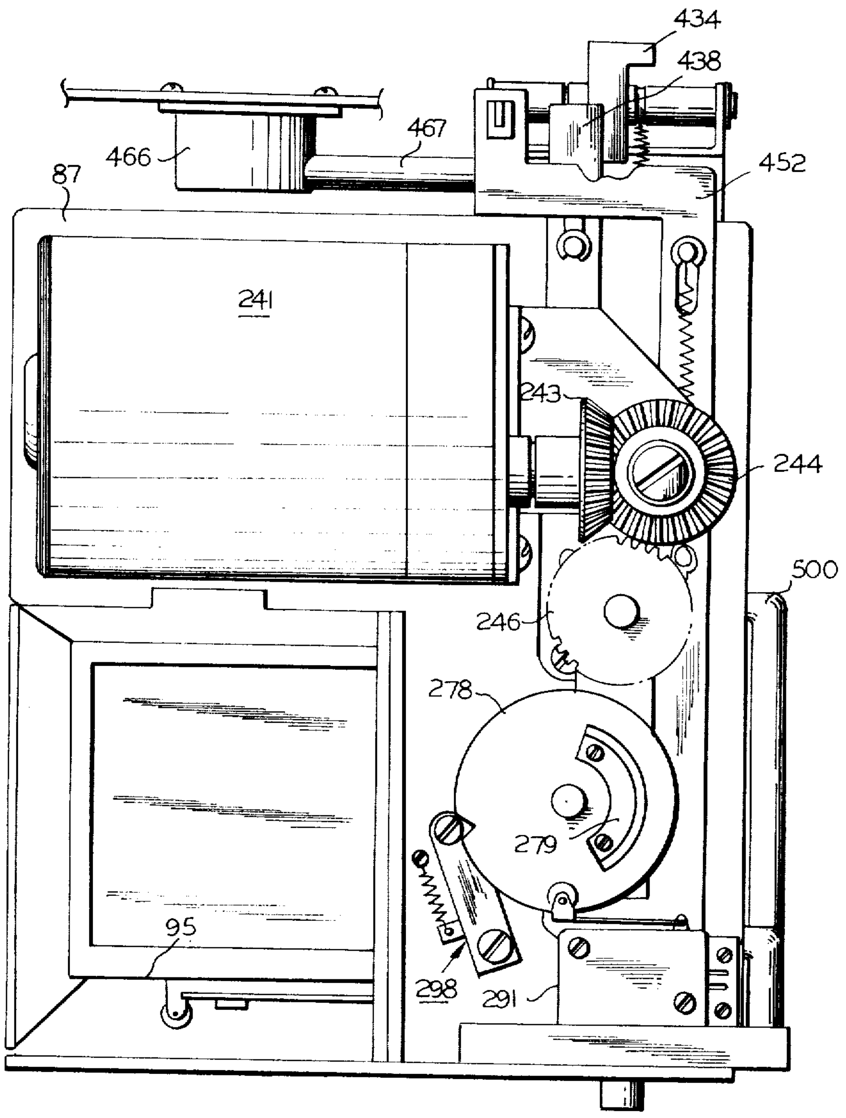
FIG. 42 is an elevational side view taken on line 42—42 of FIG. 10.

The next description will be of the control means for the mechanical assembly 48 with the reference to FIG. 27 and FIG. 28. The control means comprises a control means for the first transfer means 70, a control means for the second transfer means 71, a control means for the developing means 400 and a control means for the fixing means 485. The control means for the first transfer means 70 comprises the first clutch member 260, the second clutch member 265 and a start lever 313. The control means for the developing means 400 comprises the developing detecting lever 73. The control means for the mixing means 485 comprises the fixing detecting lever 74. The details of these control means are described together with the driving means 109. The first main gear 248 and the second main gear 250 are adapted to be in meshing engagement with the first driving gear 180 and with the second driving gear 273, respectively. Normally the first driving shaft 137 and the second driving shaft 270 are at rest because of the existance of the first cut-out portion 254 and the third cut-out portion 271, while the main shaft 247 is rotating. Upon energization of a second solenoid 310, a solenoid rod 311 rotates the start lever 313 from an initial position (shown in FIG. 27 and FIG. 29) to a second position (shown in FIG. 30) around an axle 314 against a spring 316 so that a first end portion 315 of the start lever 313 engages with a second end portion 263 of the first clutch member 260. Accordingly, the first clutch member 260 rotates around an axle 262 against a spring 264 and brings a first end portion 261 into engagement with the first nail wheel 249. The engagement of the first end portion 261 and the first nail wheel 249 initiates the rotation of the first driving gear 180 and brings the first driving gear 180 into meshing engagement with the first main gear 248 in order to rotate the first driving shaft 137. The first driving shaft 137 continues a first rotation until the second cut-out portion 255 arrives at the meshing point between the first main gear 248 and the first driving gear 180, and finally finishes the first rotation after rotating through of an angle of 180°. The first detent wheel 256 ensures the rest of the first driving shaft 137 in association with a first lever member 259 which is biased by a spring 258. During the first rotation of the first driving shaft 137, the first transfer means 70 achieves a first movement by means of the crank arm 133 and the crank lever 132 so as to transfer the unit 10 from the supplying position 65 to the exposure station 66, and finally actuates the switch 72 in order to expose the sensitive surface of the unit 10 (FIG. 14). The second solenoid 310 remains energized until the exposure is completed. Upon completion of the exposure, the second solenoid 310 is deenergized and the start lever 313 returns from the second position to the initial position by the spring 316. The start lever 313 rotates, by the return motion thereof, the locking actuating lever 182 so as to engage a first end portion 320 with the third nail wheel 252 of the main shaft 247. The engagement of the first end portion 320 with the third nail wheel 252 causes the locking member 181 to rotate around an axle 317 in order to release the second transfer means 71. The details of the control means for the second transfer means 71 will be described hereinafter with the references of FIG. 29, FIG. 30, and FIG. 31. The second transfer means 71 achieves a first motion to transfer the unit 10 from the exposure station 66 to the developing station 67 as shown in FIG. 15 and FIG. 16. As shown in FIG. 15, the developing detecting lever 73 rotates in the direction of the arrow 185 around an axis 82 by the edge of the unit 10 arriving at the developing station 67 and the end portion 330 thereof engages with a pin 282 of the third clutch member 280. The third clutch member 280 rotates around an axle 283 against a spring 284 and an end portion 281 engages with the second nail wheel 251. Accordingly, the second driving gear 273 rotates and meshes with the second main gear 250 so that the second driving shaft 270 rotates in the first rotation 337 thereof in a direction of the arrow 305. When the fourth cut-out portion 272 arrives at the meshing point, the second driving shaft 270 stops its rotation by the disengagement of the second driving gear 273 from the second main gear 250 at the fourth cut-out portion 272. The second detent wheel 278 ensures the rest of the second driving shaft 270 in association with the lever mechanism 298 as shown in FIG. 42. During the first rotation of the second driving shaft 270, the unit 10 is developed, which will be described hereinafter. At the final part of the first rotation, a detecting cam 286 on the developing cam 274 rotates a rotating lever 340 around the axle 314 against the spring 341. An end portion 342 of the rotating lever 340 is brought into engagement with a pin 268 of the second clutch member 265 which has been positioned adjacent to the first main gear 248 by the first rotation of the first driving shaft 137, so that an end portion 266 of the second clutch member 265 is rotated around an axle 267 against a spring 269. The engagement of the end portion 342 with the pin 268 causes the first main gear 248 to mesh with the first driving gear 180, so that a second rotation of the first driving shaft 137 is started. The first driving shaft 137 stops the second rotation at the first cut-out portion 254 (as shown in FIG. 27). During the second rotation, the first driving shaft 137 achieves the second movement of the first transfer means 70 so as to transfer the developed unit 10 from the developing station 67 to the fixing station 68. The first transfer means 70 arriving at the fixing station 68 rotates the fixing detecting lever 74 around an axle 83 thereof by the engagement of the stick-out portion 122 of the first transfer means 70 with the fixing detecting lever 74. An end portion 84 of the fixing detecting lever 74 engages with a pin 287 of the fourth clutch member 285 which arrives at a position adjacent to the end portion 84 of the fixing detecting lever 74 so that the fourth clutch member 285 rotates around an axle 289 against a spring 290 and brings the second driving gear 273 into meshing-engagement with the second main gear 250. The second driving shaft 270 rotates through a second rotation between the fourth cut-out portion 272 and the third cut-out portion 271. During the second rotation, the unit 10 is fixed which will be described hereinafter. At the final course of the second rotation of the second driving shaft 270, the pin 300 fixed to the second driving gear 273 rotates the guiding plate 112 of the first transfer means 70 by means of the slide member 130 in order to release the unit 10 from the unit holder 140. The pin 301 fixed to the second driving gear 273 moves the locking member 210 to release the removing means 75 so as to remove the unit 10 from the unit holder 140 to the take-out portion 25 (FIG. 26). The unit 10 is dried by the drying means upon actuation of a fourth switch 291 through the drying cam 279 before being removed.

Figure 29:
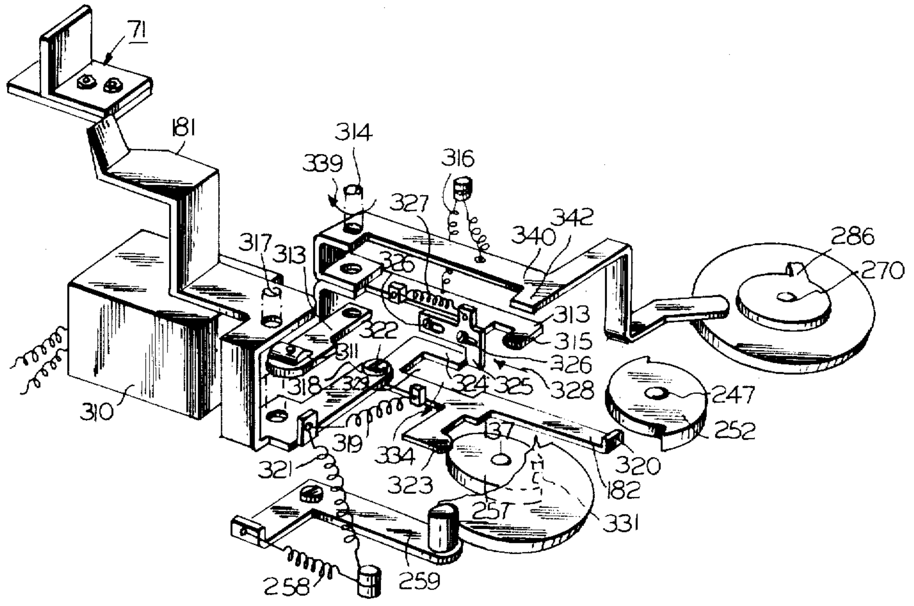
FIG. 29, FIG. 30 and FIG. 31 are fragmentary perspective views of a control means shown in FIG. 27 and FIG. 28.
Figure 30:
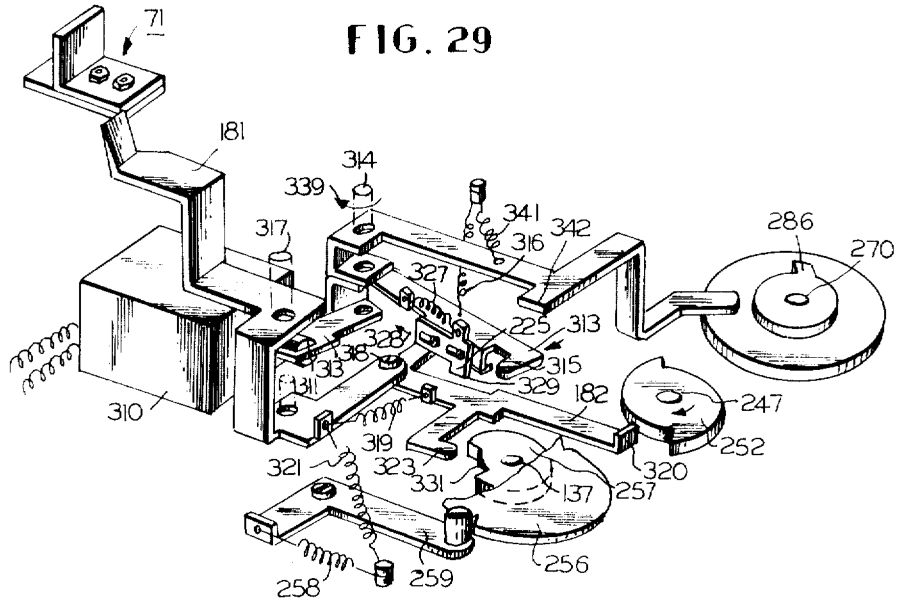
Figure 31:
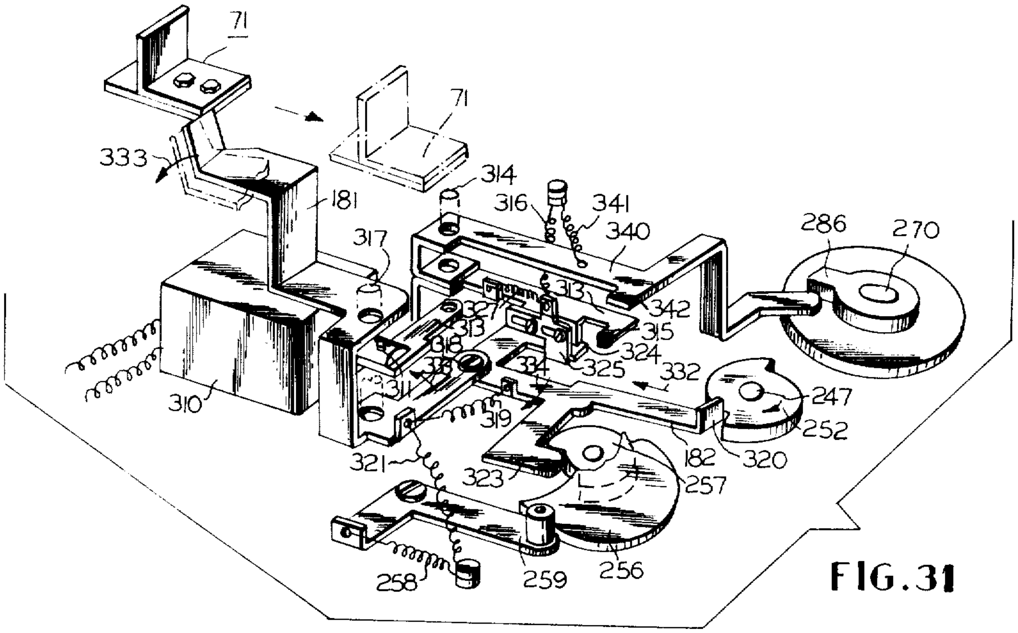

The following will describe the control means for the second transfer means 71 with the reference to FIG. 17 and from FIG. 29 to FIG. 31. The control means for the second transfer means 71 comprises the locking member 181 and a locking actuating member 182. The second transfer means 71 is normally locked at the first position as described above. As shown in FIG. 29, the locking member 181 is mounted rotatably on an axle 317 and is biased by a spring 321 so as to lock the second transfer means 71. The locking actuating member 182 is rotatably fixed to one end 322 of the locking member 181 by a pin 318, and is connected with the locking member 181 by a spring 319. The locking actuating member 182 has a projecting portion 323 in contact with the periphery of the cut-out wheel 257 fixed to the first driving shaft 137, the first end portion 320 being engageable with the third nail wheel 252 fixed to the main shaft 247, and a stick-out portion 324 being engageable with a slider 325 which is mounted on the start lever 313. The first end portion 320 is normally out of engagement with the third nail wheel 252. The start lever 313 has the slider 325 slidably mounted thereon which is guided by the two pins 326 and which is biased in the direction of the arrow 328 by a spring 327 to engage with the stick out portion 324. Upon energization of the second solenoid 310, the start lever 313 rotates in the direction of the arrow 339 around the axle 314 against the spring 316 as shown in FIG. 30, and initiates the first rotation of the first driving shaft 137 in order to achieve the first movement of the first transfer means 70. The rotation of the start lever 313 releases the engagement of the slider 325 with the stick-out portion 324 so that the slider 325 moves in the direction of the arrow 328 by the action of the spring 327 so as to drop into a hook portion 329 formed on the locking actuating member 182. The first driving shaft 137 finishes the first rotation through an angle of 180° so that a concave portion 331 of the cut-out wheel 257 moves from the position shown in FIG. 29 to the position shown in FIG. 30. The contact of the projecting portion 323 with the periphery of the cut-out wheel 257 is released. The exposure time is controlled by a timer (not shown). Upon completion of the exposure, the second solenoid 310 is deenergized and the start lever 313 rotates in a direction opposite to the arrow 339 by the action of spring 316 while the slider 325 abuts the side of the stick-out portion 324. The locking actuating member 182 rotates to the direction opposite to the arrow 334 around the axle 318 against the action of spring 319, because the force of the spring 316 is larger than that of the spring 139 (FIG. 31). The return motion of the start lever 313 makes it possible to engage the first end portion 320 of the locking actuating member 182 with the third nail wheel 252 of the main shaft 247. The engagement of the first end portion 320 with the third nail wheel 252 results in a movement of the locking actuating lever 182 in the direction of the arrow 332 to rotate the locking member 181 around the axis 317 in the direction of the arrow 333 against the spring 321, and to release finally the second transfer means 71 from the locking action of the locking member 181. Accordingly, the second transfer means 71 achieves the first motion thereof to transfer the unit 10 from the exposure rotation 66 to the developing station 67 by means of the spring 170. On the other hand, the movement of the locking actuating member 182 in the direction of the arrow 332 releases the abutment of the slider 325 from the side of the stick-out portion 324 so that the locking actuating member 182 rotates in the direction of the arrow 334 in FIG. 31 by the action of spring 319 so as to return it to the initial position thereof as shown in FIG. 29. The slider 325 engages again with the stick-out portion 324. At the same time, the locking member 181 rotates in the opposite direction to the arrow 333 by the action of spring 321 to return it the initial locking position. The cut-out wheel 257 and the projecting portion 323 are to prevent the locking actuating member 182 from mismovement. The projecting portion 323 is normally in contact with the periphery of the cut-out wheel 257 so as to prevent the engagement of the first end portion 320 with the third nail wheel 252, except when the first driving shaft 137 finishes the first rotation. Therefore, the locking actuating member 182 does not actuate the locking member 181 until the first transfer means 70 has completely transferred the unit 10 to the exposure station 66 even if the second solenoid 310 is deenergized accidentally (for instance, by the failure of the electric source).

The details of the movement of the winding means 184 for the second transfer means 71 will be described in the following with the reference to the drawings from FIG. 17 to 21. FIG. 17 shows the second transfer means 71 locked by the locking member 181 at the first position 352 thereof. The first driving gear 180 is at rest due to the disengagement from the first main gear 248 at the first cut-out portion 254. At the rest condition, the nail lever 177 rotatably fixed to the first driving gear 180 is rotated in the counterclockwise direction against a spring 179 by the engagement of the end portion 344 with the stop cam 345 which is fixed on the second base 86. As a result, the hook portion 183 of the nail lever 177 is out of engagement with the nail portion of the winding pulley 172. The winding pulley 172 remains at rest while the first driving gear 180 rotates counterclockwise from the position shown in FIG. 17 to the position shown in FIG. 19 in order to transfer the unit 10 from the supplying station 65 to the exposure station 66. Upon completion of the exposure, the locking member 181 releases the second transfer means 71 so as to move the second transfer means 71 from the first position 352 shown in FIG. 19 to the second position 353 shown in FIG. 20 by the spring 170 and by the string 168. As a result, the winding pulley 172 is rotated clockwise by the winding string 176 from the position shown in FIG. 19 to the position shown in FIG. 20. After the development is finished, the first driving gear 180 rotates through the second rotation counterclockwise from the position shown in FIG. 20 to the position shown in FIG. 17 in order to transfer the unit 10 from the developing station 67 to the fixing station 68. On the other hand, the engagement of the hook portion 183 with the nail portion 171 rotates the winding pulley 172 counterclockwise. The counterclockwise rotation of the winding pulley 172 moves the second transfer means 71 to the right in the drawing by the winding string 176. The second transfer means 71 is locked again by the locking member 181 at the first position 352 as shown in FIG. 17. After the locking member 181 locks the second transfer means 71, and end portion 344 of the nail lever 177 engages a stop cam 345 so as to rotate the nail lever 177 clockwise around the screw 178 to release the engagement of the hooked portion 183 from the nail portion 171.

The following will describe a grounding means 141 for establishing the electrical grounding during the charging. As shown in FIG. 11, the grounding means 141 comprises the grounding member 142 which is pivotally mounted on the leg portion 121 of the keeping plate 111 by a screw 143. The grounding member 142 is biased in the direction of an arrow 188 around an axis of the screw 143 by a torsion spring 144. The grounding member 142 has a hooked end portion 145 and a tapered portion 146. Referring to the drawings of FIG. 8, FIG. 12, FIG. 32, FIG. 33 and FIG. 34, the movement of the grounding means 141 will be described. An actuating means 139 for actuating the grounding member 141 comprises a control plate 147 and a stop 350. As shown in FIG. 12, the control plate 147 is rotatably fixed to the first base 85 by a screw 149 at the position between the supplying station 65 and the exposure station 66 and is biased by a spring 148 in the counterclockwise direction in the drawing. Further, the control plate 147 is normally positioned as shown in FIG. 12 and the further counterclockwise rotation is limited by a limitter (not shown). As shown in FIG. 8, the stop 350 is fixed to the first base 85 at a position adjacent to the exposure station 66.

Figure 32:
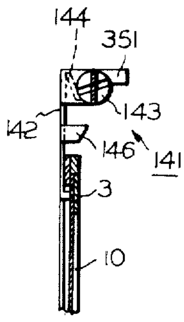
FIG. 32, FIG. 33 and FIG. 34 are fragmentary side views of a grounding member according to this invention.
Figure 33:
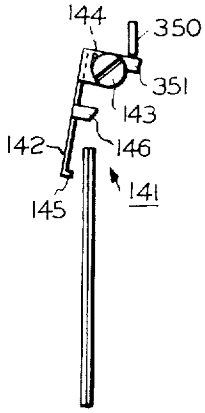
Figure 34:
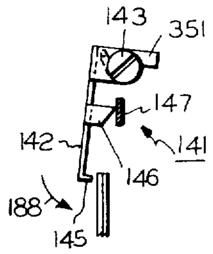

As shown in FIG. 12 and FIG. 32, the hooked end portion 145 of the grounding member 142 is in contact with the exposed conductive layer 35 at the cut-out portion 8 of the unit 10 which is normally positioned at the supplying station 65. The contact pressure of the hooked end portion 145 is determined by the torsion spring 144. The unit 10 is transferred from the supplying station 65 to the exposure station 66 while the grounding member 142 is continuing the contact with the exposed conductive layer 35 during the transfer of the unit 10. During the transfer of the unit 10, the tapered portion 146 engages the control plate 147 so as to rotate the control plate 147 clockwise against the spring 148 in FIG. 12 and the grounding member 142 maintains the contact with the exposed conductive layer 35. During the transfer of the unit 10 from the supplying station 65 to the exposure station 66, the unit 10 is efficiently charged by the charging device 76, because the electrical grounding is established during the charging. When the unit 10 is transferred to the exposure station 66, the stopper 350 engages with a second end portion 351 so as to rotate the grounding member 142 around the screw 143 against the torsion spring 144 as shown in FIG. 33. Therefore, the hooked end portion 145 separates from the unit 10 and the grounding member 142 is out of the path of movement of the unit 10. During the second movement of the first transfer means 70, that is, the movement from the developing station 67 to the fixing station 68, the control plate 147 engages the tapered portion 146 and rotates the grounding member 142 as shown in FIG. 34. Therefore, the grounding member 142 is prevented from engaging the edge of the unit 10 which is positioned at the supplying station 65. A further movement of the first transfer means 70 disengages the tape portion 146 from the control plate 147. The grounding member 142 is positioned as shown in FIG. 32, so that the hooked end portion 145 is brought into contact with the exposed conductive layer 35 of the unit 10.

Figure 38:
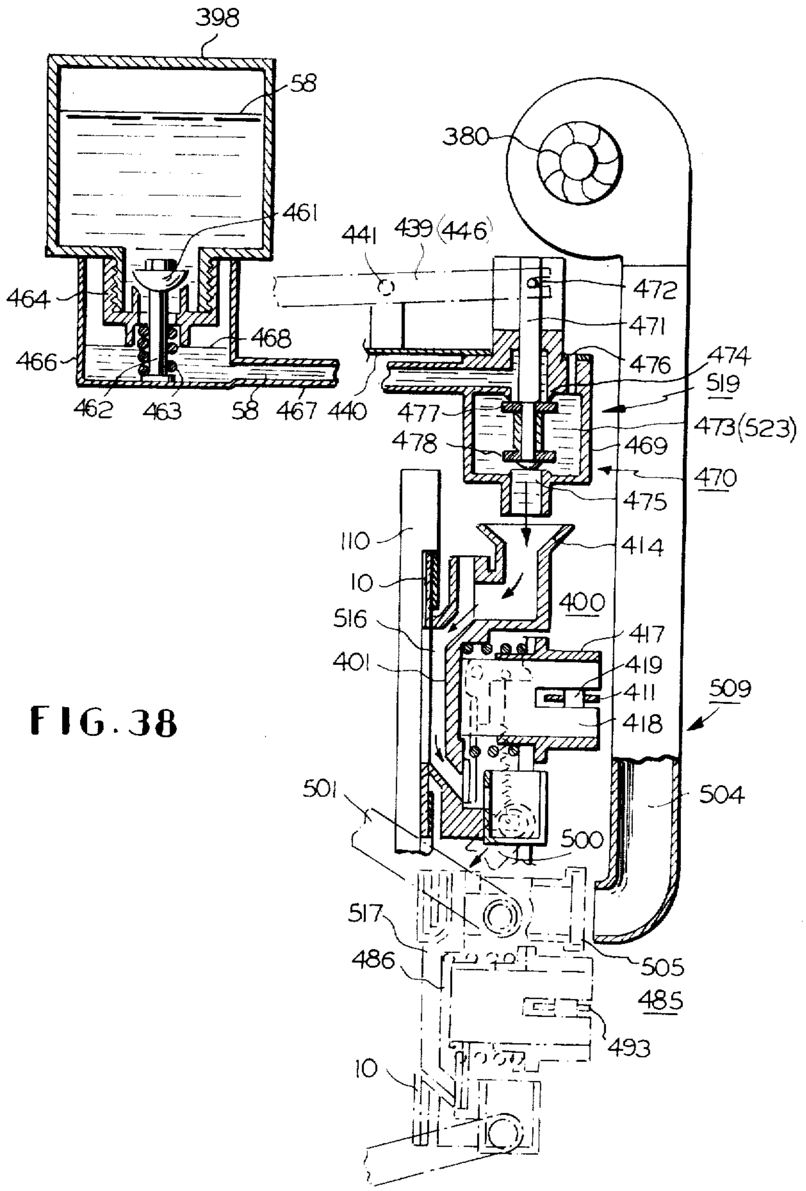
FIG. 38 is a fragmentary sectional side view of the developing means and the fixing means showing the relationship between the developing means and the fixing means and the associate means of the developing means and of the fixing means.

The next description will be of the processing means for development and fixation. The processing means comprises the developing means 400 for development, the fixing means 485 for fixation, the drying means 509, a liquid supply source 511, and a liquid control means 520. The processing liquid consists of the developing liquid 58 and the fixing liquid 59. The developing liquid 58 includes a solution having finely divided particles with a selective polarity, either negative or positive. The fixing liquid 59 includes a resin solvent. As shown in FIG. 5, the liquid supply source 511 is positioned at the upper portion of the mechanical assembly 48 and comprises a developing liquid source and a fixing liquid source, both of which have the same construction with each other. Therefore, the construction of the developing liquid source will be described in the following. As shown in FIG. 38, the developing liquid source comprises the developer receptacle 398 for the developing liquid 58, a developer pan 466, and a developer conduit 467. The developer receptacle 398 has a cap 464 which is provided with a shaft 462, a valve 461 fixed to the shaft 462 and a spring 463, and is placed upside down on the developer pan 466. The shaft 462 opens the valve 461 to introduce the developing liquid 58 into the developer pan 466. The level 468 of the developing liquid 58 is automatically kept at a predetermined level. The developing liquid 58 introduced into the developer pan 466 is transported through the conduit 467 to a developer supply pot 470 (described hereinafter).

Figure 35:
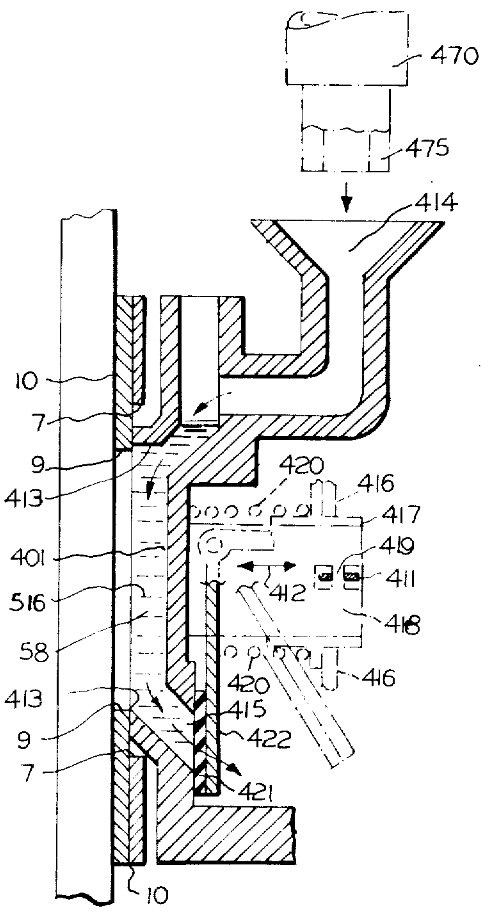
FIG. 35 is a fragmentary sectional side view of a developing means according to this invention.
Figure 37:
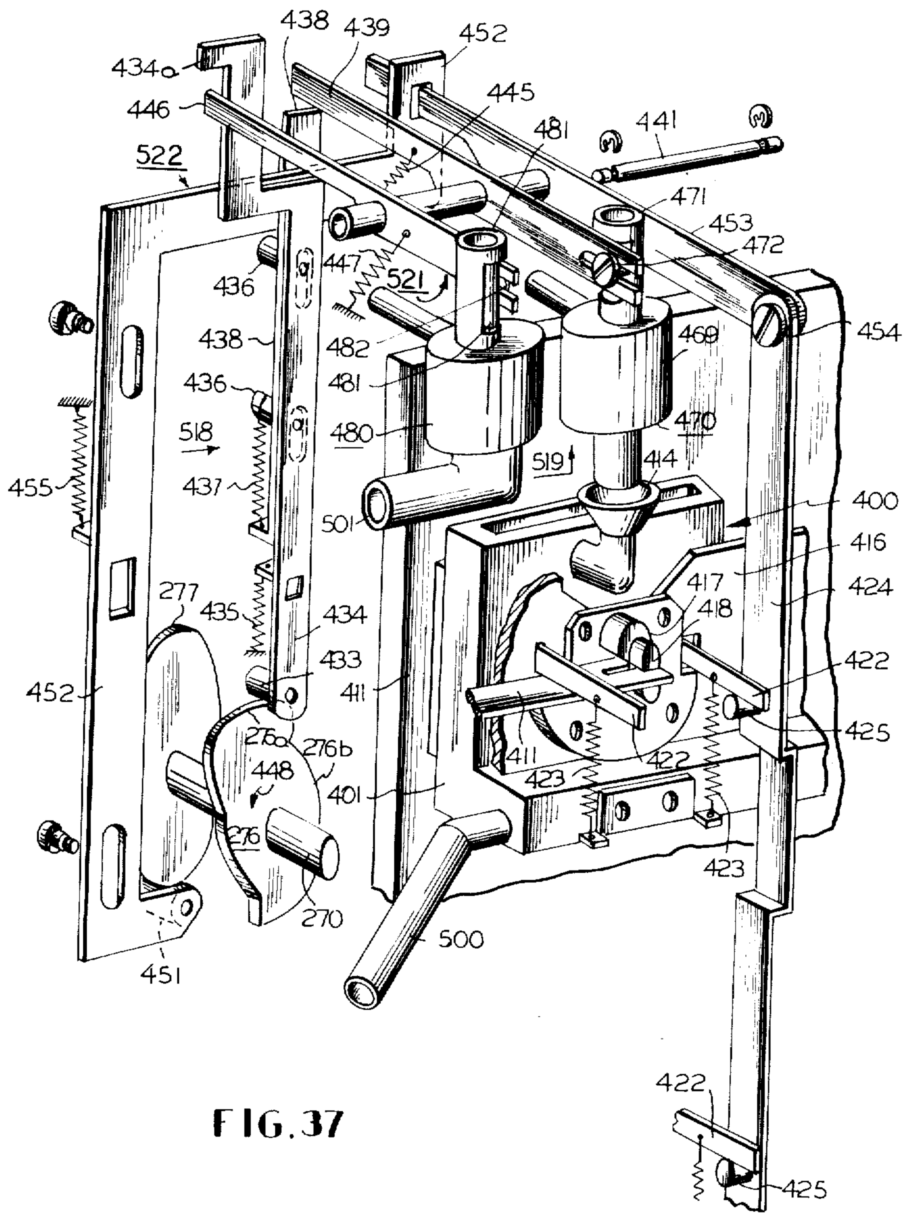
FIG. 37 is a fragmentary perspective view of the driving members for driving the liquid supplying means.

The developing means 400 comprises the developing chamber 401, and a developing actuating means 404. Similarly, the fixing means 485 comprises the fixing chamber 486, and a fixing actuating means 488. The developing chamber 401 and the fixing chamber 486 have the same construction and are called merely the processing chamber in the following description. Therefore, the construction of the developing chamber 401 will be described in the following. As shown in FIG. 35, the developing chamber 401 has an opening 413 formed at one side thereof, a liquid inlet 414 for introducing the developing liquid 58 from the developer supply pot 470 to the developing chamber 401, a liquid outlet 415 for exhausting the developing liquid 58 after the development, and a conducting rod 418 fixed thereto. As shown in FIG. 35, the opening 413 is facing the principal plane of the photosensitive unit 10 and has a size which is between the first aperture 7 and the second aperture 9 of the unit 10. The conducting rod 418 is slidably movable in the direction of the arrow 412 under the guidance of a conducting member 417 which is fixedly mounted on a fitting plate 416. As shown in FIG. 8, the fitting plate 416 is fixed to the supporters 90 which are further fixed to the first base 85. Accordingly, the developing chamber 401 is movable in a direction vertical to the principal plane of the unit 10. The conducting rod 418 has a pin 419 fixed at one end thereof, and is engaged with a first actuating lever 411 through the pin 419. The developing chamber 401 is biased toward the unit 10 so as to engage the opening 413 with the unit 10 by a compression spring 420 which is positioned between the developing chamber 401 and the fitting plate 416. However, the developing chamber 401 is normally retracted to a position which is out of the path of the unit 10, when the developing means 400 is not in action. The developing chamber 401 further has an exhaust valve 421 at the liquid outlet 415 for controlling the exhaust of the developing liquid 58. As shown in FIG. 35 and FIG. 37, the exhaust valve 421 is actuated by a valve lever 422 which is pivotally mounted on the developing chamber 401. The valve lever 422 has at one end thereof, a pair of springs 423, which bias the exhaust valve 421 to close the liquid outlet 415, and is engageable with one of a pair of pins 425 fixed to a connecting member 424. Upon arrival of the unit 10 at the developing station 67, the developing chamber 401 press fits the opening 413 against the photosensitive surface of the unit 10 as shown in FIG. 35, and forms a developing space 516 in association with the photosensitive surface of the unit 10. A predetermined quantity of the developing liquid 58 is introduced from the liquid inlet 414 into the developing space 516. The exhaust valve 421 closes the liquid outlet 415 so that the developing liquid 58 remains still at the developing space 516 for a predetermined time period so as to develop the exposed surface of the unit 10. The developing liquid 58 is subsequently exhausted from the developing space 516 when the exhaust valve 421 opens the liquid outlet 415. After the development, the developing chamber 401 disengages from the unit 10 against the compression spring 420 so that the unit 10 can be transferred to the fixing station 68. At the fixing station 68, the unit 10 is fixed by the fixing chamber 486 which has the same construction as that of the developing chamber 401.

Figure 36:
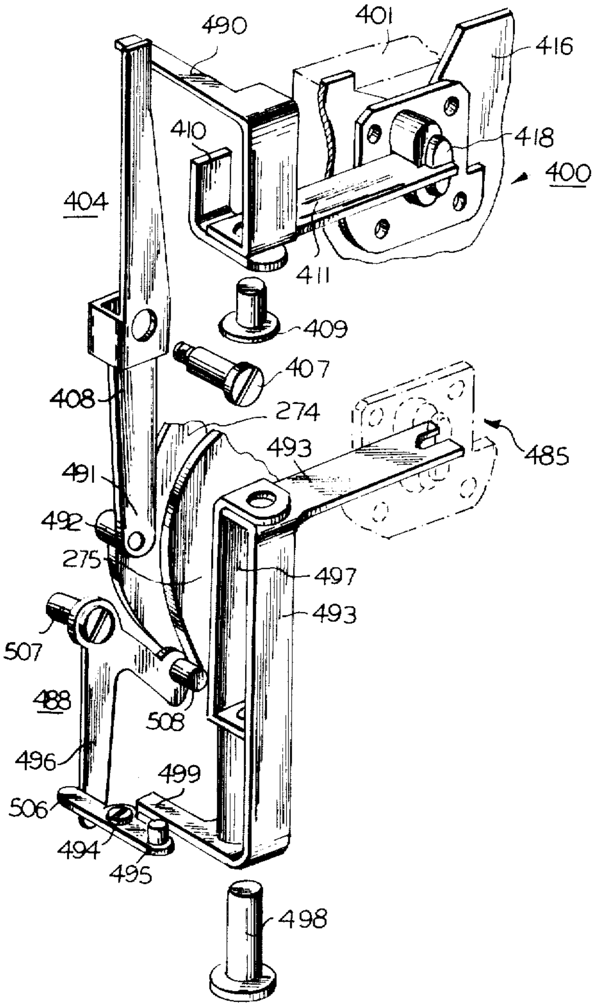
FIG. 36 is a fragmentary perspective view of the driving members for driving the developing means and the fixing means.

Next description will be of the developing actuating means 404 which comprises the first actuating lever 411 engaged with the pin 419 fixed to the conducting rod 418, and a second actuating lever 408 being controlled by the developing cam 274. As shown in FIG. 36, the first actuating lever 411 is pivotally mounted on a pin 409 on a first bracket 410 which is fixed to the fitting plate 416 and engages with the second actuating lever 408 at a second end 490 thereof. The second actuating lever 408 is pivotally mounted on a pin 407 which is fixed to the third base 87, and has a first roller 492 which engages with the developing cam 274. The fixing actuating means 488 comprises a third actuating lever 493 engaged with the pin fixed to the conducting rod of the fixing chamber 486, a fourth actuating lever 495 pivotally mounted on a pin 494 and a fifth actuating lever 496 controlled by the fixing cam 275. The third actuating lever 493 is pivotally mounted on a pin 498 on a second bracket 497, and engages with the fourth actuating lever 495 at the second end 499 thereof. The fourth actuating lever 495 engages with the fifth actuating lever 496 as shown in FIG. 36. The fifth actuating lever 496 is pivotally mounted on a pin 507 which is fixed to the third base 87 and has a second roller 508 which engages the fixing cam 275. The developing actuating means 404 and the fixing actuating means 488 actuate the developing chamber 401 and the fixing chamber 486 by the developing cam 274 and by the fixing cam 275, respectively, in a co-operative relationship with the transfer of the unit 10, as described hereinabove in the description of the driving means 109.

In the following, the liquid control means 520 will be described. Said means 520 comprises a liquid supply means 521 and a liquid exhaust means 522. As shown in FIG. 37, the liquid exhaust means 522 comprises the exhaust cam 277 fixed to the second driving shaft 270, a connecting plate 452 having a roller 451 which engages the exhaust cam 277. The connecting plate 452 engages an end portion of an exhaust lever 453 at one end thereof, and the exhaust lever 453 is connected with the connecting member 424 at the other end portion thereof by a pin 454. The connecting member 424 has the pair of pins 425 fixed thereto which engage with the valve levers 422 of developing means 400 and of fixing means 485, respectively. The connecting plate 452 is biased by a spring 455 so that the roller 451 follows the exhaust cam 277. The exhaust lever 453 is pivotally mounted on a fixed plate 440 (as shown in FIG. 38) on a shaft 441. The rotation of the exhaust cam 277 causes the connecting plate 452 to move the valve levers 422 through the connecting member 424 and the pins 425. As a result, the valve levers 422 cause the exhaust valve 421 to open and to close respectively at the time determined by the profile of the exhaust cam 277.

The liquid supply means 521 will be described in the following with reference to FIG. 37 and FIG. 38. The liquid supply means 521 comprises a liquid supply pot 519 and an actuating mechanism 518 for the liquid supply pot 519. The liquid supply pot 519 includes the developer supply pot 470 and a fixer supply pot 480 which have the same construction as each other. The developer supply pot 470 will be described. The developer supply pot 470 comprises a developer measure room 473 and a developer valve shaft 471 slidably movable therein. The developer measure room 473 is connected with the developer pan 466 by the conduit 467. The developer measure room 473 has an ingress port 474 communicating with the conduit 467, an egress port 475 and an air vent 476. The developer valve shaft 471 engages, by means of a pin 472, with a developer supply lever 439 which is pivotally mounted on a shaft 441. Further, the developer valve shaft 471 has an ingress valve 477 and an egress valve 478 fixed thereto, respectively. When the developer valve shaft 471 is moved downward by the developer supply lever 439, the ingress valve 477 opens the ingress port 474 and the egress valve 478 closes the egress port 475 so that the developing liquid is introduced into the developer measure room 473. When the developer valve shaft 471 is moved upward, the ingress valve 477 closes the ingress port 474 and the egress valve 478 opens the egress port 475 so that the developing liquid in the developer measure room 473 is exhausted to the liquid inlet 414. Therefore, a predetermined quantity of the developing liquid 58 corresponding to the volume of the developer measure room 473 is supplied to the developing means 400 at every development. Similarly the fixer supply pot 480 comprises a fixer measure room 523, and a fixer valve shaft 481. They have the same construction as those of the developer supply pot 470. Accordingly, a predetermined quantity of the fixing liquid 59 is supplied to the fixing means 485 at every fixation.

Figures 39, 40, 41:
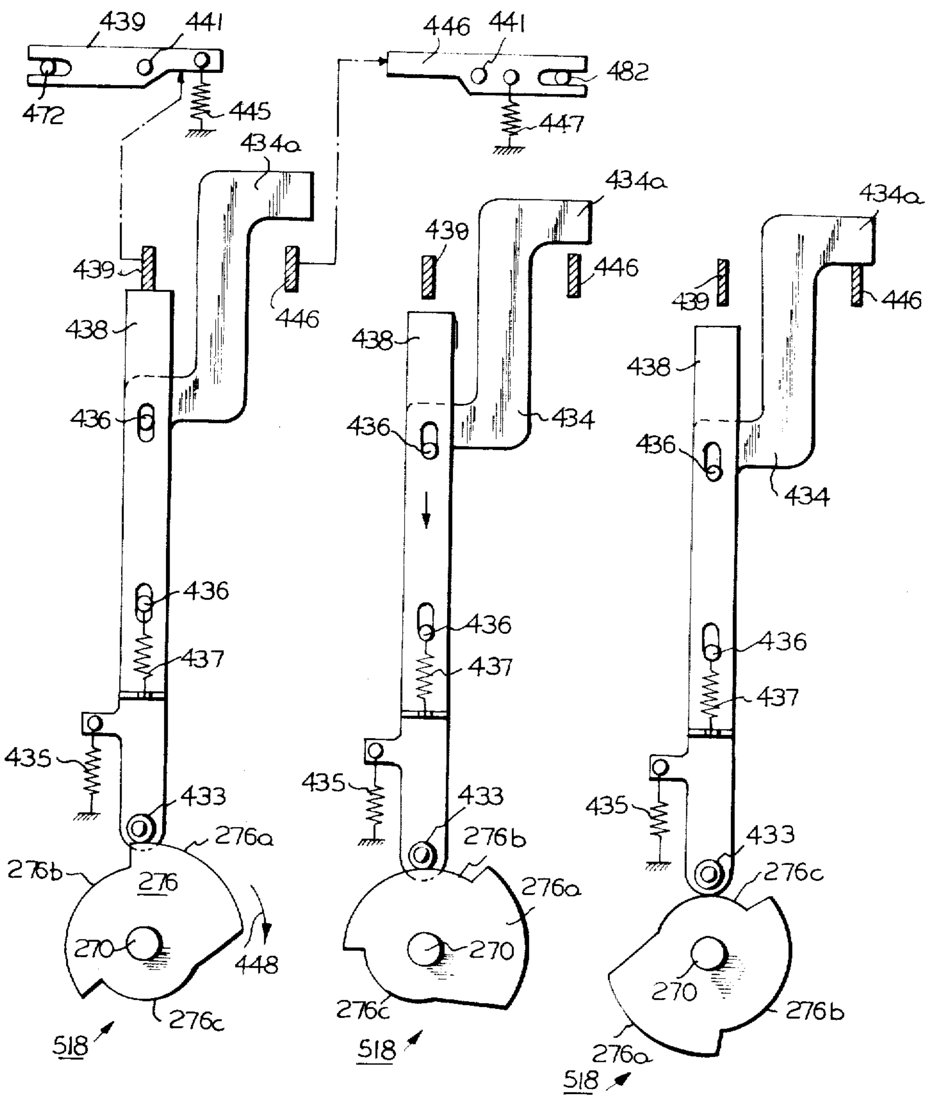
FIG. 39, FIG. 40 and FIG. 41 are the schematic views showing the movement of the driving members shown in FIG. 37.

The actuating mechanism 518 for the liquid supply pot 519 is described in the following with the reference to FIG. 37 and the movement thereof is shown from FIG. 39 to FIG. 41. The actuating mechanism 518 comprises a fixing connecting member 434, a developing connecting member 438, a fixer supply lever 446 and the developer supply lever 439. The fixing connecting member 434 has a roller 433 which engages with the liquid supply cam 276 fixed to the second driving shaft 270, and is biased by a spring 435 so that the roller 433 follows the periphery of the liquid supply cam 276. The developing connecting member 438 is slidably mounted on the fixing connecting member 434 by the pins 436 and is biased by a spring 437 toward the liquid supplying cam 276. The developer supply lever 439 is pivotally mounted on the fixed plate 440 by the shaft 441 and engages the developing connecting member 438 at one end thereof, and the developer valve shaft 471 at the other end thereof. The developer supply lever 439 is biased by a spring 445 so as to move the developer valve shaft 471 upwardly. The fixing connecting member 434 is engageable with the fixer supply lever 446 at a hooked portion 434*a* thereof. The fixer supply lever 446 is pivotally mounted on the fixed plate 440 by the shaft 441 and engages a pin 482 on a fixer valve shaft 481. Further, the fixer supply lever 446 is biased by a spring 447 so as to move the fixer valve shaft 481 downwardly. As shown in FIG. 37, the liquid supply cam 276 has a first periphery 276*a*, a second periphery 276*b*, and a third periphery 276*c* and normally stops at the position shown in FIG. 39. At the position shown in FIG. 39, the fixing connecting member 434 disengages from the fixer supply lever 446 and the developing connecting member 438 engages the developer supply lever 439 so that both the fixer supply lever 446 and the developing connecting member 438 engage the developer supply lever 439 so that the fixer supply lever 446 and the developer supply lever 439 move the fixer valve shaft 446 and the developer valve shaft 471 downwardly so as to close the ingress ports, respectively. The rotation of the cam 276 in the direction of the arrow 448 causes the fixing connecting member 434 to engage with the second periphery 276*b* of the cam 276 as shown in FIG. 40, and to disengage the developing connecting member 438 from the developer supply lever 439. Therefore, the developer supply lever 439 moves the developer valve shaft 471 upwardly so that the predetermined quantity of the developing liquid 58 is supplied to the developing means 400. However, the fixing connecting member 446 still remains disengaged from the fixer supply lever 446 so that the fixing liquid 59 is not supplied. The further rotation of the cam 276 causes the fixing connecting member 434 to engage with the third periphery 276*c* of the cam 276 as shown in FIG. 41 so that the hooked end portion 434*a* engages with the fixer supply lever 446. Accordingly, the fixer supply lever 446 moves the fixer valve shaft 481 upwardly in order to supply a predetermined quantity of the fixing liquid 59 to the fixing means 485. The cam 276 returns to the initial position as shown in FIG. 39 by the further rotation thereof.

The following will describe the whole movement of the processing means with the reference to FIG. 8, FIG. 37 and FIG. 38. The arrival of the unit 10 at the developing station 67 causes the second driving shaft 270 to rotate so that the developing chamber 401 is pressed against the unit 10 by means of the developing cam 274, developing actuating means 404 and the compression spring 420. Subsequently, the developing liquid 58 is supplied to the developing chamber 401 from the developer supply pot 470 in order to develop the exposed surface of the unit 10. After the development, the exhaust valve 421 exhausts the used liquid to the drain receptacle 63 through a drain pipe 500, and the developing chamber 401 disengages from the unit 10 by means of the developing cam 274 and the developing actuating means 404. The developed unit 10 is transferred to the fixing station 68. The unit 10 is fixed by the fixing liquid 59 which is supplied from the fixer pot 480 to the fixing chamber 486 through a supply pipe 501 shown in FIG. 37. The used liquid at the fixing station is exhausted to the drain receptacle 63. After the fixation, a drying means 509 dries the fixed unit 10.

As shown in FIG. 38 and FIG. 42, the drying means 509 comprises a fan motor 380, a first duct 504 for guiding the air, a second duct 505 provided on the fixing chamber 486, the drying cam 279 fixed to the second driving shaft 270 and an fourth electric switch 291. Upon completion of the fixation, the drying cam 279 actuates the switch 291 so as to operate the fan motor 380 for blowing air into the fixing chamber 486 through the first duct 504 and the second duct 505. After the unit 10 is completely dried, the unit 10 is taken away to the take-out portion 61 by means of the removing means 75.

Figure 43:
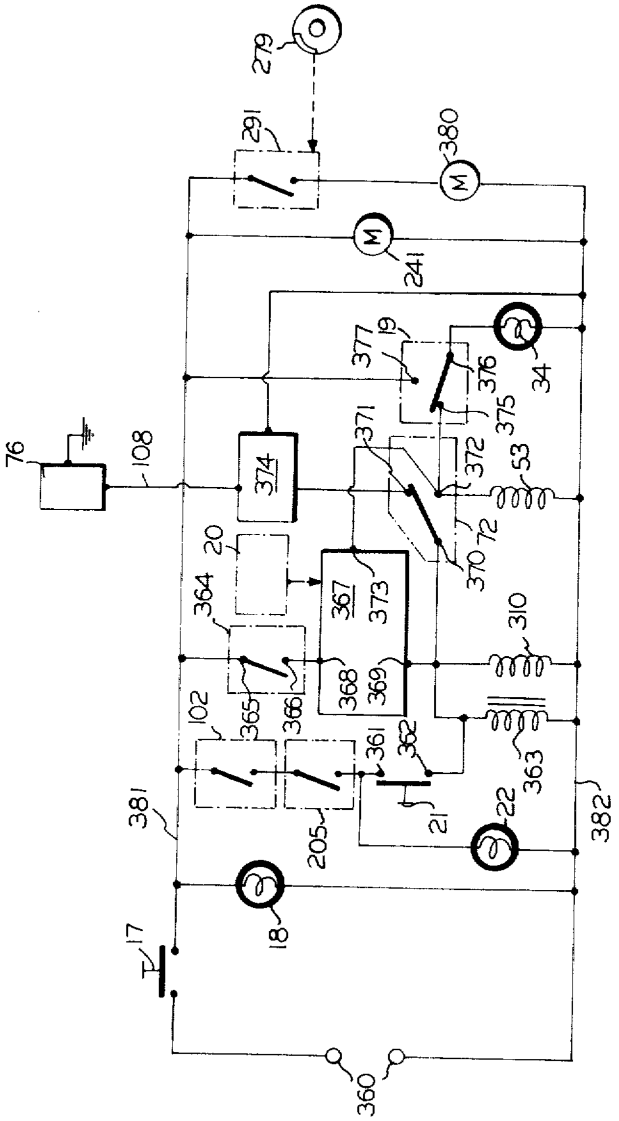
FIG. 43 is an electrical circuit diagram for controlling the apparatus according to this invention.

The following will describe the electrical circuit for controlling the apparatus with the reference to FIG. 43. An alternating current is supplied from the supply terminal 360 to a first line 381 and to a second line 382 through the power switch 17. When the power switch 17 is turned on, the pilot lamp 18 is lighted to indicate the connection to the power supply. The first switch 102, the second switch 205, the start switch 21, the relay 363, and the second solenoid 310 are connected in series with each other and are located between the lines 381 and 382. The indicator lamp 22 is connected between a terminal 361 of the start switch 21 and the second line 382. The first switch 102 is on during the presence of the unit 10 at the supplying station 65, and is off during the absence of the unit 10 from the station 65. The second switch 205 is off when the removing means 75 is at the first position 226 and is on when the removing means 75 is spaced from the first position 226.

Accordingly, when a unit 10 is present at the supplying station 65 and moreover a finished unit 10 is removed from the apparatus, the indicator lamp 22 is lighted and the start switch 21 is operable. A normally opened contact 364 of the relay 363 is connected between the first line 381 and a terminal 368 of a timer 367 and closes when the relay 363 is energized. A terminal 369 of the timer 367 is connected to the relay 363, the second solenoid 310 and a terminal 370 of the third switch 72. The terminals 368 and 369 of the timer 367 normally close and remain closed while the timer 367 is activated. The terminals 368 and 369 open when the timer 367 is deactivated.

The activation time of the timer 367 is controlled by turning the timer knob 20. The third switch 72 is operable by the movement of the first transfer means 70. Normally, the terminals 370 and 371 are connected. However, upon arrival of the first transfer means 70 at the exposure station 66, the terminals 370 and 372 are connected while the terminals 370 and 371 are disconnected. The terminal 371 is connected to a high voltage generator 374 which in turn is connected to the second line 382 and to the charging device 76 by the high tension electric cord 108. The terminal 372 is connected to the terminal 373 of the timer 367, the first solenoid 53 and a terminal 375 of the lamp switch 19. A terminal 376 is connected to the main lamp 34 which in turn is connected to the second line 382. A terminal 377 of the lamp switch 19 is connected to the first line 381. Normally, the terminals 375 and 376 are connected. By depression of the lamp switch 19, the terminals 377 and 376 are arbitrarily connected so as to light the main lamp 34. The electric motor 241 is connected between the first line 381 and the second line 382. The fan motor 380 is connected between the first line 381 and the second line 382 through a normally opened fourth switch 291.

When the power switch 17 is turned on, the pilot lamp 18 is lighted and the motor 241 rotates. When a unit 10 is present at the supply station 65 and a finished unit 10 is removed from the mechanical assembly 48, the switches 102 and 205 close and the indicator lamp 22 is lighted. By depression of the start switch 21, the relay 363 is energized so as to close the contact 364. The relay 363 remains energized by an electrical circuit passing through the terminals 368 and 369 of the timer 367. At the same time, the second solenoid 310 is energized so as to initiate the first movement 346 of the first transfer means 70, which movement moves the removing means 75 away from the first position 226 thereof and opens the second switch 205. Furthermore, the high voltage generator 374 is activated by an electrical circuit passing through the terminals 370 and 371, and supplies a D.C. high voltage to the charging device 76 through the high tension electric cord 108. Accordingly, the unit 10 is charged during the transfer from the supplying station 65 to the exposure station 66. When the first transfer means 70 transfers the unit 10 to the exposure station 66, the terminals 370 and 372 of the third switch 72 are connected so that the high voltage generator 374 is deactivated. At the same time, the first solenoid 53 is energized in order to actuate the second mirror 52, and then the main lamp 34 is lighted. Further, the timer 367 is activated by a circuit passing through the terminals 372 and 373. At the end of the activation time, the terminals 368 and 369 are disconnected so that the main lamp 34 is extinguished accordingly, the first solenoid 53, the second solenoid 310, and the relay 363 are deenergized. Upon completion of exposure, the return motion of the second solenoid 310 caused by the deenergization thereof actuates the second transfer means 71, and the aforementioned mechanical assembly 48 carries out the developing and fixing process. Finally, the drying cam 279 actuates the fourth switch 291 so that the fan motor 380 rotates in order to dry the fixed unit 10. Upon completion of the drying, the removing means 75 removes the unit 10 and closes the switch 205.

FEATURES OF THE APPARATUS

The apparatus according to the invention is characterized by the following features.

1. The apparatus according to the invention produces a finished unit having a visible image on a photosensitive film which is mounted on a mount. The finished unit can be promptly projected by a conventional slide projector. On the contrary, the conventional photographic apparatus produces a mere film having a visible image, and the film must be mounted on a mount for the projection by means of another machine or a hand operation.

2. The apparatus according to the invention produces a visible image in a reduced size of an original on the unit in a short time.

3. The apparatus according to the invention produces a visible image on the photosensitive film mounted on a mount without staining the mount.

4. In the apparatus according to the invention, the area of contact of the processing liquid with the photosensitive film is limited to the image area of the film and the other area is out of contact with the processing liquid so that the other area is prevented from being stained by the processing liquid.

5. In the apparatus according to the invention, the processing means are out of engagement with the unit during the transfer of the unit so that the unit is transferred reliably and is protected from damage caused by the undesirable contact of the processing means with the unit.

6. In the apparatus according to the invention, a first transfer means transfers the unit from the supplying station to the exposure station by the first movement thereof, and the second transfer means transfers the unit from the exposure station to the developing station in a direction transverse to the first movement of the first transfer means. The first transfer means transfers the unit from the developing station to the fixing station by a second movement thereof in a direction opposite to the first movement. Therefore, space is economized because said four stations occupy only a small space and can be built into a compact apparatus.

7. In the apparatus according to the invention, the second transfer means is moved by a spring in a direction from the exposure station to the developing station so as to transfer the unit and is returned to the exposure station against the action of the spring by a winding mechanism which is driven by a driving shaft for the first transfer means. Therefore, a driving power source is not necessary for the second transfer means so that the apparatus can be made compact and inexpensive.

8. In the apparatus according to the invention, the first driving shaft is driven by a power source to drive the transfer means, and the second driving shaft is driven by the same power source to drive the processing means when the first driving shaft is not driven. That is, the power source drives the first driving shaft and the second driving shaft alternatively so that the necessary power for the power source can be reduced.

9. In the apparatus according to the invention, a solenoid initiates the first movement of the first transfer means in order to transfer the unit from the supplying station to the exposure station upon energization, and releases the locking of the second transfer means in order to transfer the unit from the exposure station to the developing station upon deenergization. Therefore, only one solenoid controls the operation of both the first transfer means and the second transfer means.

10. In the apparatus according to the invention, the second transfer means is biased by a spring in a direction from the exposure station to the developing station and is locked by a locking member at the exposure station. The locking member releases the second transfer means by a locking actuating member which is driven by a main shaft when the locking actuating member engages with the nail portion of the main shaft upon deenergizations of a solenoid. In general, a considerable force is necessary to release a body from a locking member when the body is biased by a spring. According to the invention, the force is transmitted to the locking actuating member from the main shaft so that the locked body is reliably released without using a solenoid having a big output power.

11. In the apparatus according to the invention, a removing means is biased by a spring in a direction from the first position thereof to the second position thereof and is locked at the first position by a lock member. The removing means removes the unit reliably from the transfer means to the takeout portion.

12. In the apparatus according to the invention, the removing means returns from the second position to the first position by the first movement of the first transfer means and is locked at the first position by the lock member. Therefore, a driving power source for the removing means is not necessary so that the apparatus can be made compact and inexpensive.

13. The apparatus according to the invention, has a sensing means for detecting the presence of the unit at the supplying station. The sensing means makes the apparatus operative when the unit is present at the supply station and makes the apparatus inoperative when the unit is absent from the station. The sensing means informs of the absence of the unit at the supplying station and prevents the apparatus from pollution which is caused by a spill of the processing liquid by operation in the absence of a unit.

14. The apparatus according to the invention has a developing detecting means for detecting the arrival of the unit at the developing station and for initiating the operation of the developing means. The developing means does not operate in the absence of a unit at the developing station. Therefore, the apparatus is prevented from causing a spill of the developing liquid even if the apparatus is operated in the absence of a unit.

15. The apparatus according to the invention has a fixing detecting means for detecting the arrival of the first transfer means carrying a unit at the fixing station thereof and for initiating the operation of the fixing means. The fixing means does not operate in the absence of a unit at the fixing station. Therefore, the apparatus is prevented from causing a spill of the fixing liquid even when the apparatus is operated in the absence of a unit.

16. In the apparatus according to the invention, the unit is charged during the transfer by the first movement of the first transfer means. The first transfer means has a grounding means which is in contact with a conductive layer of the electrophotosensitive film during the first movement of the first transfer means. Therefore, the electrophotosensitive film is grounded during the charging. The charging efficiency of the charging device is greatly improved by the grounding means. When there is no grounding, an approximate 8 kilo-volt potential is necessary between the charging device and the grounding. The potential is successfully reduced to 5 kilo-volts by the grounding means according to the invention.

17. In the apparatus according to the invention, the mount has a first aperture formed in one side thereof, and a second aperture formed in another side thereof, one of which is larger in size than the other. The processing means has an opening with a size between the sizes of the two apertures in the side portion thereof. The processing means press fits the opening against the film at the edge portion of the smaller aperture when the processing means moves vertically to said principal plane of the film. Therefore, the mount is out of contact with the processing liquid so that stains caused by the processing means is prevented. Further, the smaller aperture defines an effective image area projected by a projector and is smaller than the opening. Accordingly, the effective image area excludes the unevenness of the image quality generated at the marginal portion of the image area.

18. The apparatus according to the invention has an electric switch for detecting the presence of the removing means at the second position thereof. The electric switch completes a control circuit for the apparatus when the removing means is at the second position and breaks the control circuit when the removing means is apart from the second position. By an operation of a start switch, the control circuit actuates the apparatus to initiate the first movement of the first transfer means and to move the removing means so that the removing means is away from the second position and the electric switch breaks the control circuit. Accordingly, the first transfer means does not start again even if the start switch is operated, once the apparatus is in action.

What is claimed is:

1. A photographic apparatus for producing a visible image on a photosensitive unit including a photosensitive film mounted on a film mount, said apparatus comprising:

1. a supplying station including a supplying means for supplying said photosensitive unit to said supplying station;

2. an exposure station for exposing said film to an image of an original projected by means of a light source and an optical system so as to form a latent image on said film;

3. a processing station including a developing station and a fixing station, and further including processing means for producing a visible permanent image on said exposed film;
4. first transfer means movable from said supplying station to said exposure station and from said developing station to said fixing station for transferring said unit from said supplying station to said exposure station and for further transferring said unit from said developing station to said fixing station and for maintaining said unit at said stations during exposing and developing, respectively;
5. second transfer means movable from said exposure station to said developing station for transferring said unit from said exposure station to said developing station;
6. removing means for removing said unit from said fixing station to a take-out position; and
7. driving means coupled to said first transfer means, said second transfer means and said processing means for driving said first transfer means, said second transfer means and said processing means.

2. A photographic apparatus according to claim 1, wherein said processing means includes processing chamber means having an opening, and means for press fitting processing means against the film with said opening against a principal plane of said film and forming a processing space to receive a processing liquid when said photosensitive unit is transferred to said processing station.

3. A photographic apparatus according to claim 2, wherein said processing chamber means has a liquid inlet, an air vent at the upper portion thereof and a liquid outlet at the lower portion thereof, whereby said processing liquid is supplied through said liquid inlet while residual air in said processing space escapes through said air vent, and said processing liquid can be held in said processing space for a predetermined time period so as to process said exposed film and is exhausted through said liquid outlet.

4. A photographic apparatus according to claim 2, wherein 1. said film mount has a first aperture in one side thereof and a second aperture in another side thereof, one of which apertures is larger in size than the other and;
2. said processing chamber means opening has a size between those of said two apertures,
3. and said processing chamber means is press fitted against said film through the larger of said apertures with said chamber means defining said opening against said film at the edge portion of said smaller aperture when said processing chamber means moves perpendicular to said principal plane of said film.

5. A photographic apparatus according to claim 2, wherein 1. said first transfer means is reciprocally movable in said plane to transfer said unit from said supplying station to said exposure station by a first movement thereof, and to transfer said unit from a developing station to fixing station by a second movement thereof, wherein the direction of said second movement is opposite to said first movement,
2. and said second transfer means is reciprocally movable in a direction, which is transverse to said movements of said first transfer means, so as to transfer said unit from said exposure station to said developing station.

6. A photographic apparatus according to claim 2, wherein said driving means comprises;

1. a main shaft continuously rotating while said apparatus is in action,
2. a first driving shaft intermittently engageable with said main shaft so as to drive said first transfer means,
3. a second driving shaft which is intermittently engageable with said main shaft when said first driving means is not driven, and which drives said processing means.

7. A photographic apparatus according to claim 6, wherein 1. said first driving shaft has a winding means attached thereto,
2. said second transfer means is normally locked at a first position thereof by a locking means and is spring-biased in a direction from said exposure station to said developing station, whereby said second transfer means transfers said exposed unit from said exposure station to said developing station when said locking means releases said second transfer means upon completion of exposure, and returns to said first position against said spring-bias so as to be locked with said locking means through a winding movement of said winding means while said first transfer means transfers said unit from said developing station to said fixing station.

8. A photographic apparatus according to claim 7, said apparatus further comprising control means for controlling said first transfer means and said second transfer means; wherein said control means comprises, 1. a first clutch member which is attached to said first driving shaft,
2. a start lever driven by an energized solenoid to actuate said first clutch member,
3. a locking actuating member adapted to actuate said locking member upon deenergization of said solenoid, whereby said first clutch member brings said first driving shaft into meshing engagement with said main shaft upon energization of said solenoid, and said locking actuating member releases said second transfer means from said locking member upon deenergization of said solenoid.

9. A photographic apparatus according to claim 8, wherein said locking actuating member 1. rotates around an axis thereof by a return motion of said solenoid caused by a deenergization thereof so as to engage with a nail member which is provided on said main shaft, and actuates said locking member to release said second transfer means by means of the rotating force of said main shaft.

10. A photographic apparatus according to claim 2, wherein said removing means further comprises 1. a removing member spring-biased in a direction from a first position thereof to a second position thereof and engageable with said first transfer means, and 2. a removing locking member adapted to lock said removing member at said first position, whereby said removing member moves from said first position to said second position so as to remove said photosensitive unit from said first station when said removing locking member releases said removing member, and said removing member moves, in engagement with said first transfer means, from said second position to said first position so as to be locked at said first position by said removing locking member while said first transfer means moves from said supply station to said exposure station.

11. A photographic apparatus according to claim 1, wherein said supplying station further comprises a sensing means for detecting the existance of said unit at said supply station to control said first transfer means in operation.

12. A photographic apparatus according to claim 8, wherein said control means further comprises a third clutch member which is attached to said second driving shaft and a developing detecting lever which is coupled with movement of said photosensitive unit at said developing station, whereby said developing detecting lever is rotated around an axis thereof by an edge of said photosensitive unit so as to actuate said third clutch member to initiate rotation of said second drive shaft when said unit arrives at said developing station.

13. A photographic apparatus according to claim 8, wherein said control means further comprises a fourth clutch member which is attached to said second driving shaft, and a fixing detecting lever which is coupled with said first transfer means at said fixing station, whereby said fixing detecting lever is rotated around an axis thereof by said first transfer means to initiate the rotation of said second drive shaft when said first transfer means arrives at said fixing station.

14. A photographic apparatus according to claim 10, wherein said removing means further comprises;

a second electric switch means which is positioned to be coupled with said removing member so that an electric circuit for said apparatus opens when said removing means is apart from said second position and closes when said removing means is in said second position.

* * * * *